US012574924B2

(12) United States Patent (10) Patent No.: US 12,574,924 B2
Chen et al. (45) Date of Patent: Mar. 10, 2026

(54) METHOD FOR DUPLEX OPERATION AND USER EQUIPMENT USING THE SAME

(71) Applicant: Acer Incorporated, New Taipei City (TW)

(72) Inventors: Jen-Hsien Chen, New Taipei City (TW); Chien-Min Lee, New Taipei City (TW); Li-Chung Lo, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 407 days.

(21) Appl. No.: 18/302,001

(22) Filed: Apr. 18, 2023

(65) Prior Publication Data

US 2023/0354321 A1 Nov. 2, 2023

Related U.S. Application Data

(60) Provisional application No. 63/336,242, filed on Apr. 28, 2022.

(51) Int. Cl.
H04W 72/04 (2023.01)
H04W 72/12 (2023.01)
H04W 72/1268 (2023.01)
H04W 72/1273 (2023.01)
H04W 72/23 (2023.01)
H04W 72/566 (2023.01)

(52) U.S. Cl.
CPC ... H04W 72/1268 (2013.01); H04W 72/1273 (2013.01); H04W 72/23 (2023.01); H04W 72/566 (2023.01)

(58) Field of Classification Search
None
See application file for complete search history.

(56) References Cited

U.S. PATENT DOCUMENTS

| | | | |
|---|---|---|---|
| 2010/0027446 A1 | 2/2010 | Choi et al. | |
| 2021/0067308 A1 | 3/2021 | Ly et al. | |
| 2021/0360670 A1 | 11/2021 | Huang et al. | |
| 2021/0377938 A1 | 12/2021 | Huang et al. | |
| 2021/0391963 A1 | 12/2021 | Abdelghaffar et al. | |
| 2022/0046722 A1* | 2/2022 | Kim | H04L 5/0048 |
| 2022/0182110 A1* | 6/2022 | Zhang | H04W 24/10 |
| 2022/0294591 A1* | 9/2022 | Liu | H04L 5/0053 |
| 2023/0276389 A1* | 8/2023 | Ko | H04W 72/04 370/350 |
| 2023/0283436 A1* | 9/2023 | Bhamri | H04L 5/0092 370/329 |
| 2024/0251425 A1* | 7/2024 | Liu | H04W 72/232 |
| 2025/0097917 A1* | 3/2025 | Harada | H04W 72/0453 |
| 2025/0240148 A1* | 7/2025 | Jabi | H04W 72/0446 |

FOREIGN PATENT DOCUMENTS

| | | |
|---|---|---|
| JP | 2021514552 | 6/2021 |
| WO | 2017038531 | 3/2017 |
| WO | 2017213222 | 12/2017 |
| WO | 2020065893 | 4/2020 |
| WO | 2021231003 | 11/2021 |

* cited by examiner

*Primary Examiner* — Sai Aung
(74) *Attorney, Agent, or Firm* — JCIPRNET

(57) ABSTRACT

An aspect of the disclosure includes a method for, including: receiving at least one indication indicating at least one of a DL reception and a UL transmission; and performing the DL reception through a first resource or the UL transmission through a second resource according to a rule.

21 Claims, 23 Drawing Sheets

: dynamic scheduled UL transmission

: higher layer configured UL transmission

: CORESET associated with group(1) SS

: dynamic scheduled UL transmission

: CORESET associated with group(2) SS

: dynamic scheduled UL transmission

: dynamic scheduled PDSCH or CSI-RS

: higher layer scheduled PDSCH or CSI-RS

: SR

: dynamic scheduled DL reception

: SR

: higher layer scheduled DL reception

: higher layer configured UL transmission, e.g., CG-PUSCH

: dynamic scheduled DL reception

: dynamic scheduled UL transmission

: higher layer scheduled DL reception

METHOD FOR DUPLEX OPERATION AND USER EQUIPMENT USING THE SAME

CROSS-REFERENCE TO RELATED APPLICATION

This application claims the priority benefit of U.S. provisional patent application Ser. No. 63/336,242, filed on Apr. 28, 2022. The entirety of the above-mentioned patent application is hereby incorporated by reference herein and made a part of this specification.

TECHNICAL FIELD

This disclosure is directed to a method for duplex operation and a user equipment using the same.

BACKGROUND

Third generation global partnership project (3GPP) are developing the 5G wireless access technology, known as new radio (NR). 5G NR is intended to address a variety of usage scenarios to meet new requirements associated with latency, reliability, security, scalability (e.g., with Internet of Things (IoT)), and other requirements. 5G NR includes services related to enhanced mobile broadband (eMBB), large-scale machine type communication (mMTC), and ultra-reliable low-latency communication (URLLC). Nevertheless, there still a need for further multiple-access improvements in 5G NR technology. These improvements may also be applicable to other multi-access technologies and the telecommunication standards that employ these technologies. For example, the conventional duplex operations have become no longer able to meet the needs of 5G NR.

The conventional duplex operation includes Time Division Duplex (TDD) and Frequency Division Duplex (FDD). Specifically, TDD uses the same frequency band for both transmitting and receiving data, but not at the same time. In TDD, data transmission and reception happen in non-overlapping time resource so that only the transmitter or the receiver is active at any given time. On the other hand, FDD uses two separate frequency bands for transmitting and receiving data. In FDD, the transmitting and receiving frequencies are separated by a defined frequency gap, which allows for simultaneous transmission and reception without interference. Although TDD is more flexible, allocation of a limited time duration for the uplink (UL) in TDD would result in reduced coverage and increased latency. Namely, TDD may introduce higher latency especially for UL as wireless devices need to wait for UL resource to send UL transmission. Besides, in both TDD and FDD, there is substantial wastage of spectrum resources. That is, it would be worth to study the feasibility of allowing the simultaneous existence of downlink (DL) transmission and UL transmission (also known as Full Duplex).

Therefore, Sub-band Full Duplex (SBFD) which is intended to solved uplink latency issue is introduced in 5G NR. In SBFD, the TDD carrier split into sub-bands is used to enable simultaneous transmission and reception in the same slots. It should be noted that, SBFD differs from conventional FDD. In conventional FDD, a given carrier and/or bandwidth part (BWP) is typically fully dedicated either for uplink or downlink communication. With SBFD, a portion of the time-frequency resources on a given carrier are dedicated for UL, and a portion of the time-frequency resources on that same carrier support DL. However, in the current specification of 5G NR system, how to deal with time domain conflict of UE's UL and DL operation when applying Full Duplex (e.g., (SBFD) has not been specifically specified yet. But such a specification is needed to reduce UL delay.

SUMMARY

Accordingly, the disclosure is directed to a method for duplex operation and a user equipment using the same.

In one of exemplary embodiments, the disclosure is directed to a method for duplex operation used by a UE, and the method would include but no limited to: receiving at least one indication indicating at least one of a DL reception and a UL transmission; and performing the DL reception through a first resource or the UL transmission through a second resource according to a rule.

In one of the exemplary embodiments, the disclosure is directed to a UE which would include not limit to: a transceiver and a processor coupled to the transceiver, and configured to: receive at least one indication indicating at least one of a DL reception and a UL transmission; and perform the DL reception through a first resource or the UL transmission through a second resource according to a rule.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
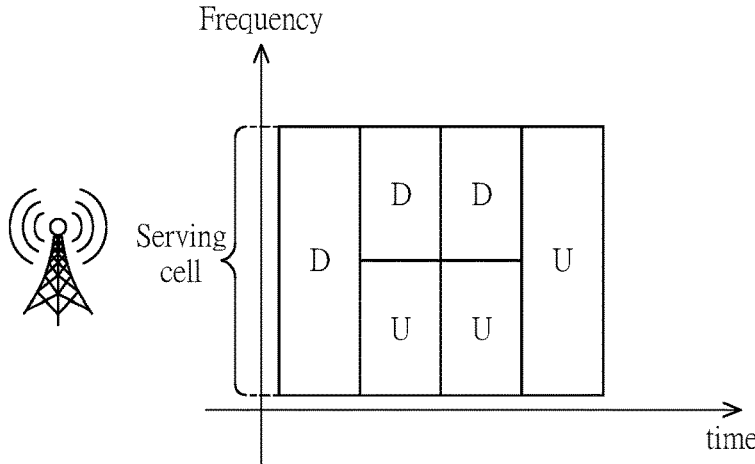
FIG. 1 is a schematic diagram that illustrates full-duplex communication at BS.

It is to be understood that both the foregoing general description and the following detailed description are exemplary, and are intended to provide further explanation of the disclosure as claimed. Wherever possible, the same reference numbers are used in the drawings and the description to refer to the same or like parts.

Several aspects of wireless communication systems will now be presented with reference to various apparatus and methods. These apparatus and methods will be described in the following detailed description and illustrated in the accompanying drawings by various elements, such as blocks, components, circuits, processes, algorithms, etc. These elements may be implemented using electronic hardware, computer software, or any combination thereof. Whether such elements are implemented as hardware or software depends upon the particular application and design constraints imposed on the overall system. Accordingly, in one or more example embodiments, the functions described in this disclosure may be implemented in hardware, software, or any combination thereof. If implemented in software, the functions may be stored on or encoded as one or more instructions or code on a computer-readable medium.

FIG. 1 is a schematic diagram that illustrates full-duplex communication at BS side. Referring to FIG. 1, "D" stands for downlink (DL), and "U" stands for uplink (UL). If a BS support sub-band non-overlapping full duplex, some slots or symbols may be split into at least two sub-bands which are respectively in charge of DL transmission and UL reception, such that the BS is allowed to perform simultaneous transmission and reception at the same time but in different non-overlapping sub-bands. That is, full-duplex communication can be achieved in unpaired spectrum, where transmissions in different directions occur in different sub-bands of the carrier bandwidth.

Figure 2:
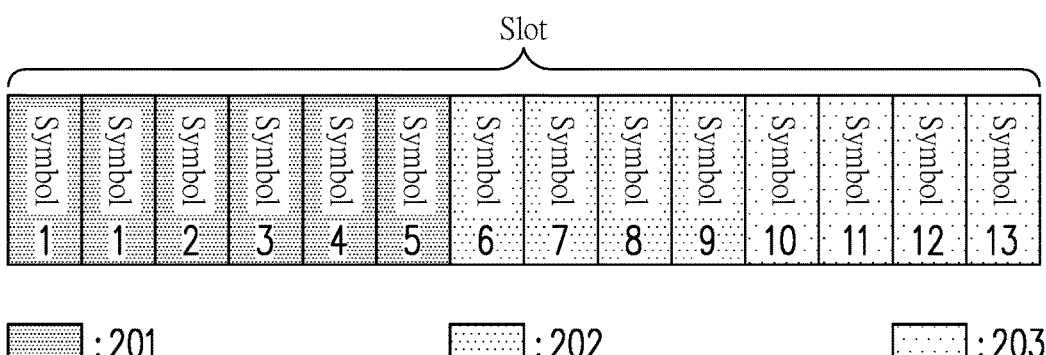
FIG. 2 is a schematic diagram that illustrates a slot configuration.

FIG. 2 is a schematic diagram that illustrates a slot configuration. Referring to FIG. 2, a slot format may include DL symbols 201, flexible symbols 202, and UL symbols 203. The following indications may be applicable for each serving cell to indicate a UE about transmission direction in one slot: tdd-UL-DL-ConfigurationCommon (carried by radio resource control (RRC) message), tdd-UL-DL-ConfigurationDedicated (carried by RRC message), and slot format indicator (SFI)-Radio Network Temporary Identifier (RNTI) (carried by RRC message and used to receive downlink control information (DCI) such as DCI format 2_0). That is, the slot format may be indicated to a UE by the above indications.

Figure 3:
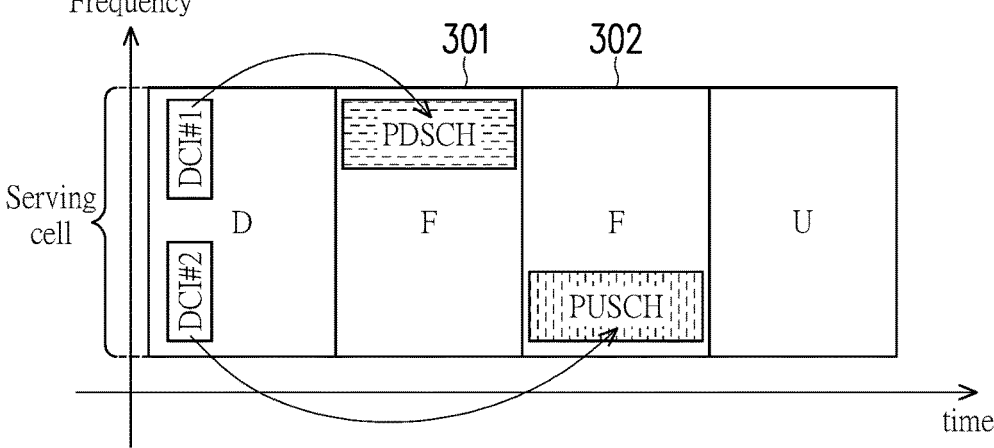
FIG. 3 is a schematic diagram that illustrates dynamic scheduling of DL reception and UL transmission in the different flexible resource.

FIG. 3 is a schematic diagram that illustrates dynamic scheduling of DL reception and UL transmission in the different flexible resource. Referring to FIG. 3, in response to that a UE detects a DCI format indicating to the UE to perform a DL reception in a flexible resource 301, the UE may perform the DL reception (i.e., PDSCH) in the flexible resource 301. Besides, in response to that a UE detects a DCI format indicating to the UE to perform a UL transmission in a flexible resource 302, the UE may perform the UL transmission (i.e., PUSCH) in the flexible resource 302. It should be noted that, for one flexible resource, UE may not (e.g., expect to) receive DL signal and transmit UL signal simultaneously. That is, the UE may not perform UL transmission and DL reception simultaneously in the same flexible resource.

Figure 4A:
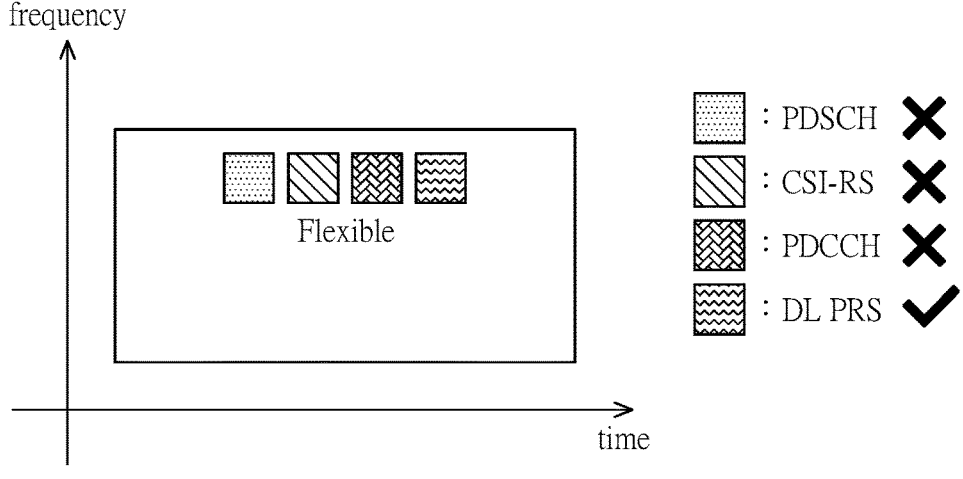
FIG. 4A is a schematic diagram that illustrates reception limitations of a flexible resource at DL part with detecting DCI format 2_0.

FIG. 4A is a schematic diagram that illustrates reception limitations of a flexible resource at DL part with detecting DCI format 2_0. Referring to FIG. 4A, if a UE is configured with a flexible resource by higher layer configuration and detects a DCI format 2_0 indicating the flexible resource as flexible resource, then the DL reception in such flexible resource may be limited as the following conditions shown in FIG. 4A. The UE may not receive a physical downlink control channel (PDCCH) in the flexible resource. If the UE is configured by higher layers to receive a physical downlink shared channel (PDSCH) or channel state information Reference signal (CSI-RS) in the flexible resource, the UE may not receive the PDSCH or CSI-RS in the flexible resource. If the UE is configured by higher layers to receive DL positioning signal (PRS) in the flexible resource, the UE may receive the DL PRS in the flexible resource.

Figure 4B:
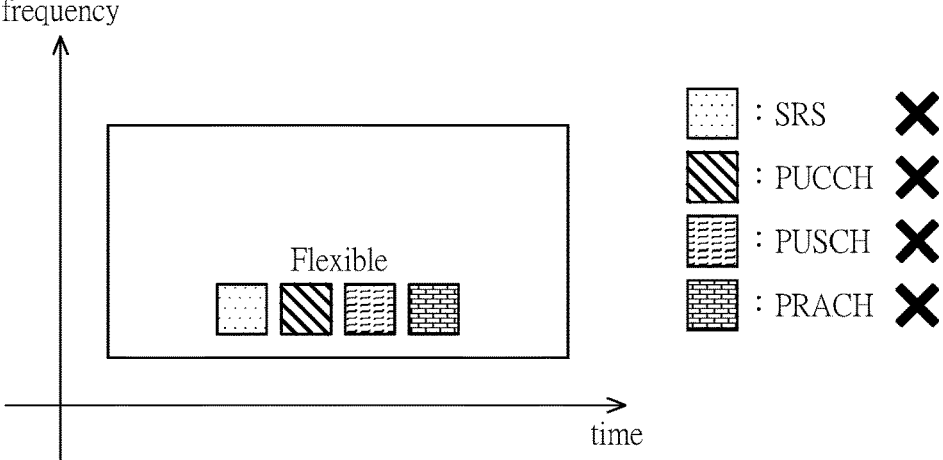
FIG. 4B is a schematic diagram that illustrates transmission limitations of a flexible resource at UL part with detecting DCI format 2_0.

FIG. 4B is a schematic diagram that illustrates transmission limitations of a flexible resource at UL part with detecting DCI format 2_0. Referring to FIG. 4B, if a UE is configured with a flexible resource by higher layer configuration and detects a DCI format 2_0 indicating the flexible resource as flexible resource, then the UL transmission in such flexible resource may be limited as the following conditions shown in FIG. 4B. If the UE is configured by higher layers to transmit a sounding reference signal (SRS) in the flexible resource, the UE may not transmit the SRS in the flexible resource. If the UE is configured by higher layers to transmit a physical uplink control channel (PUCCH) in the flexible resource, the UE may not transmit the PUCCH in the flexible resource. If the UE is configured by higher layers to transmit a physical uplink shared channel (PUSCH) in the flexible resource, the UE may not transmit the PUSCH in the flexible resource. If the UE is configured by higher layers to transmit a physical random access channel (PRACH) in the flexible resource, the UE may not transmit the PRACH in the flexible resource.

Figure 4C:
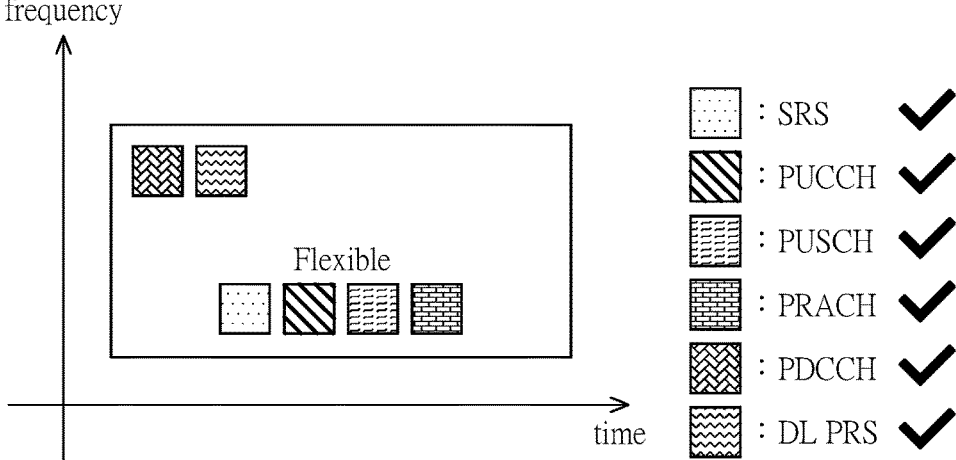
FIG. 4C is a schematic diagram that illustrates transmission and reception without detecting DCI format 2_0.

FIG. 4C is a schematic diagram that illustrates transmission and reception without detecting DCI format 2_0. Referring to FIG. 4C, if a UE is configured with a flexible resource by higher layer configuration but does not detect a DCI format 2_0 indicating the flexible resource as flexible resource, then the UL transmission and the DL reception in such flexible resource may be as the following conditions shown in FIG. 4C. The UE may receive PDCCH in the flexible resource. If the UE is configured by higher layers to receive DL PRS in the flexible resource, the UE may receive the DL PRS in the flexible resource. If the UE is configured by higher layers to transmit SRS in the flexible resource, the UE may transmit the SRS in the flexible resource. If the UE is configured by higher layers to transmit PUCCH in the flexible resource, the UE may transmit the PUCCH in the flexible resource. If the UE is configured by higher layers to transmit PUSCH in the flexible resource, the UE may transmit the PUSCH in the flexible resource. If the UE is configured by higher layers to transmit PRACH in the flexible resource, the UE may transmit the PRACH in the flexible resource.

In the future wireless communication system, e.g., 5G NR system, a bandwidth part (BWP) may be used to allocate some bands to the UE which has difficulty in supporting a broadband in a wireless communication system using the broadband. Various numerologies (e.g., Sub-carrier spacing (SCS), Cyclic Prefix (CP) length, etc.) may be supported for the same carrier in the future wireless communication system. A BWP may include a set of consecutive physical resource blocks (PRBs) in the future wireless communication system. Further, BWP switching procedure is used to activate an inactive BWP and deactivate an active BWP at a time.

Figure 5A:
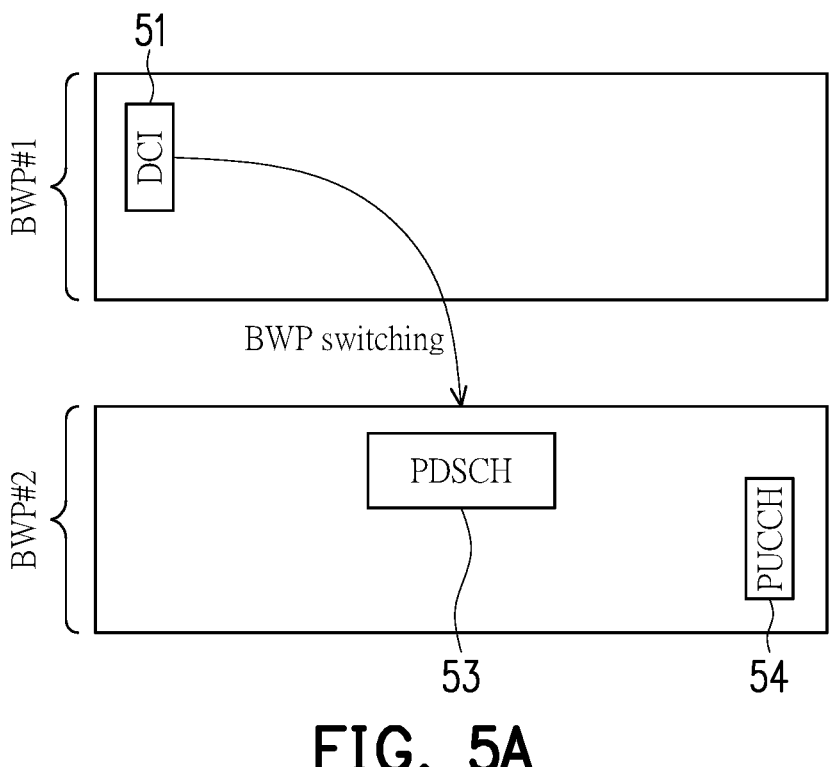
FIG. 5A is a schematic diagram that illustrates BWP switching for DL reception.

FIG. 5A is a schematic diagram that illustrates BWP switching for DL reception. Referring to FIG. 5A, a UE may receive a DCI 51 which is a DCI format 0_1 in the first BWP, and the DCI 51 may indicate the UE to receive PDSCH 53 in the second BWP. Therefore, the UE may perform BWP switching from the first BWP to the second BWP, so as to receive PDSCH 53 in the second BWP. In some case, after receiving the PDSCH 53, the UE may stay in the second BWP and may transmit HARQ feedback by PUCCH 54 corresponding to the PDSCH 53 in the second BWP.

Figure 5B:
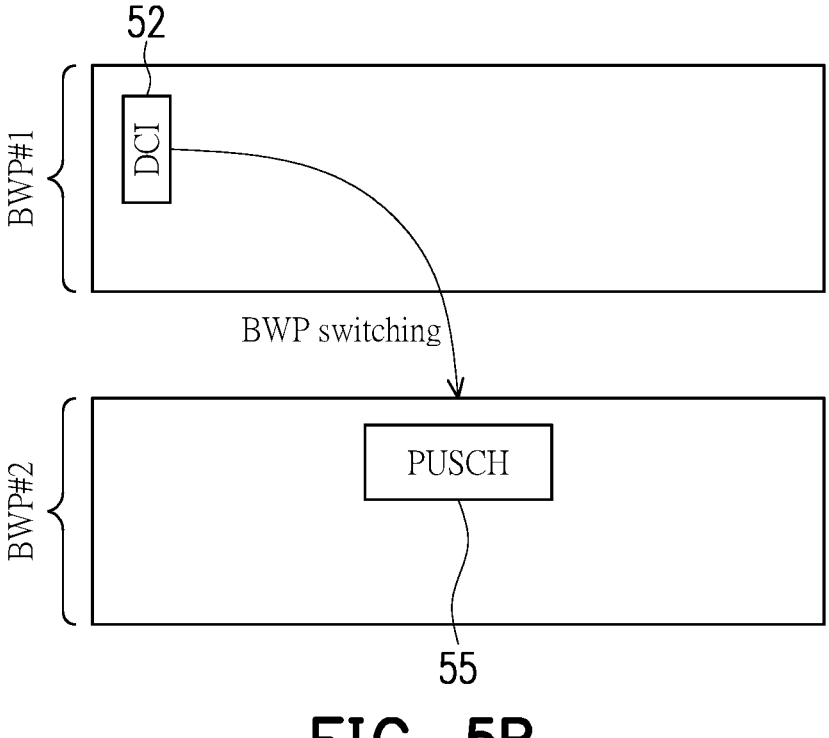
FIG. 5B is a schematic diagram that illustrates BWP switching for UL transmission.

FIG. 5B is a schematic diagram that illustrates BWP switching for UL transmission. Referring to FIG. 5B, a UE may receive a DCI 52 which is a DCI format 1_1 in the first BWP, and the DCI 52 may indicate the UE to transmit PUSCH 55 in the second BWP. Therefore, the UE may perform BWP switching from the first BWP to the second BWP, so as to transmit PUSCH 55 in the second BWP. In some case, after the PUSCH transmission, the UE may state in the second BWP.

Figure 6A:
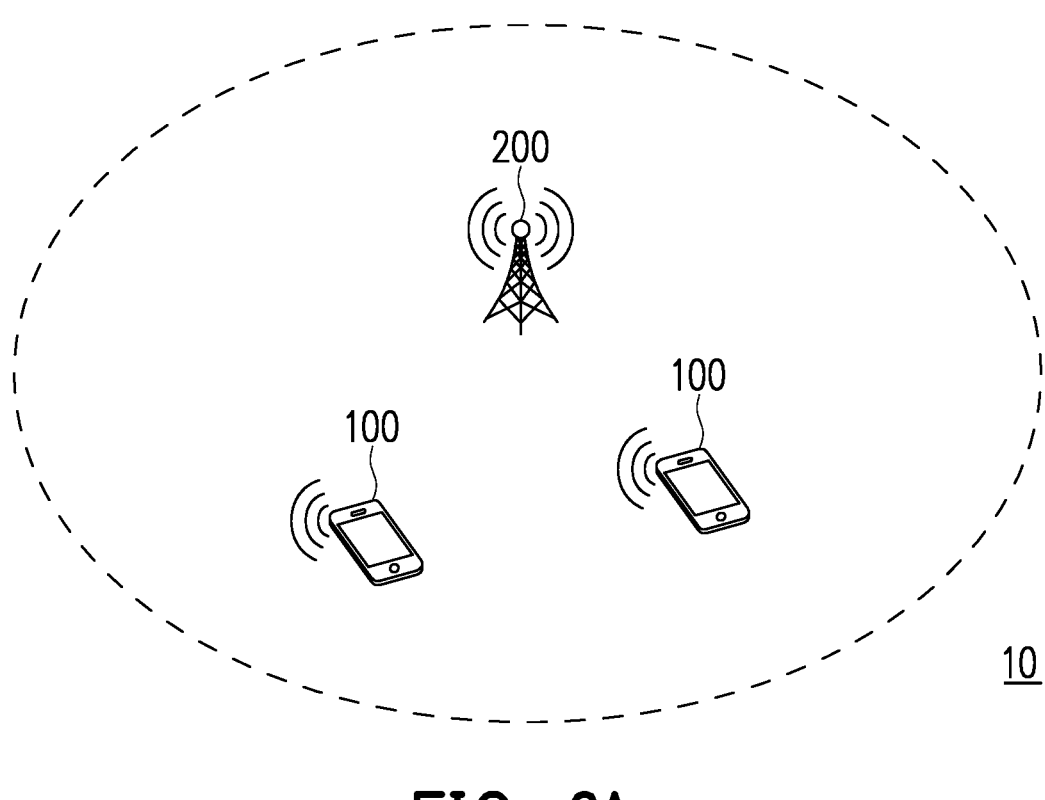
FIG. 6A is a schematic diagram that illustrates a communication system according to an exemplary embodiment of the present disclosure.

FIG. 6A is a schematic diagram of a wireless communication system according to an embodiment of the disclosure. Referring to FIG. 6A, the wireless communication system 10 includes at least, but not limited to, a UE 100 and a base station 200. The wireless network 10 may be or may include elements of a 5G (e.g., NR) network and/or a 4G (e.g., Long Term Evolution (LTE)) network, among other examples. In some examples, the wireless communications system 10 may support enhanced broadband communications, ultra-reliable communications, low latency communications, communications with low-cost and low-complexity devices, or any combination thereof.

The base station 200 and the UE 100 may wirelessly communicate via one or more communication links. The base station 200 may provide a coverage area over which the UE 100 and the base station 200 may establish one or more communication links. The coverage area may be an example of a geographic area over which the base station 200 and the UE 100 may support the communication of signals according to one or more radio access technologies. A base station 200 may be a macro base station, a pico base station, a femto base station, which is not limited in the disclosure.

The base station 200 may support the operations of the cells. Each cell may be operable to provide services to at least one UE 100 within its radio coverage. Specifically, each cell (often referred to as a serving cell) may provide services to serve one or more UEs 100 within its radio coverage (e.g., each cell schedules the Downlink (DL) and optionally Uplink (UL) resources to at least one UE within its radio coverage for DL and optionally UL packet transmission). The base station 200 may communicate with one or more UEs 100 in the radio communication system through the plurality of cells.

The base station 200 may include, for example, a NR base station, an LTE base station, a Node B, an eNB (e.g., in 4G), a gNB (e.g., in 5G), a Node-B, an advanced BS (ABS), a transmission reception point (TRP), an unlicensed TRP, a base transceiver system (BTS), an access point, a home BS, a relay station, a scatterer, a repeater, an intermediate node, an intermediary, satellite-based communication BSs, and so forth.

The UE 100 may communicate with a network (e.g., a Core Network (CN), an Evolved Packet Core (EPC) network, an Evolved Universal Terrestrial Radio Access network (E-UTRAN), a 5G Core (5GC), or an internet), through a RAN established by one or more base station 200. Wireless communication between the base station 200 and the UE 100 may be described as utilizing an air interface. Transmissions over the air interface from the base station 200 to the UE 100 may be referred to as downlink (DL) transmission. Transmissions from the UE 100 to the base station 200 may be referred to as uplink (UL) transmissions.

The UE 100 may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth. Besides, the UE 100 may be considered as, for example, a machine-type communication (MTC) or evolved or enhanced machine-type communication (eMTC) UE. An MTC UE and/or an eMTC UE may include, for example, a robot, a drone, a remote device, a sensor, a meter, a monitor, and/or a location tag, that may communicate with a base station, another device (e.g., a remote device), or some other entity.

In some embodiments, in the wireless communication system 10 utilizing orthogonal frequency division multiplexing (OFDM), a duplexing scheme often called sub-band full duplex (SBFD) may be used. In some embodiments, the BS 200 may operate in full duplex (e.g., SBFD) while the UE 100 remain half duplex operation.

To facilitate understanding of the technical solutions of the embodiments of the disclosure, the technical concepts related to the embodiments of the disclosure are described below.

Figure 6B:
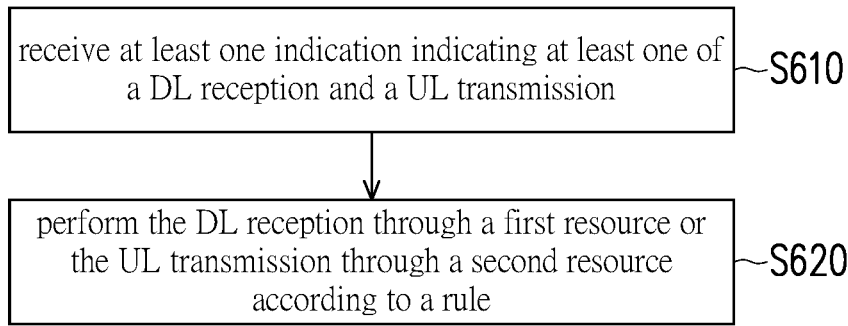
FIG. 6B a flowchart of a method for duplex operation according to an embodiment of the disclosure.

FIG. 6B a flowchart of a method for duplex operation according to an embodiment of the disclosure. Referring to FIG. 6B, the method of this embodiment may be adapted for the UE 100 under the wireless communication system 10 of FIG. 6A. Nevertheless, the processes of this method may be adjusted according to the actual needs and thus are not limited to the following.

In S610, the UE 100 may receive at least one indication indicating at least one of a DL reception and a UL transmission. In some embodiments, the DL reception and the UL transmission are overlapped in time domain. Specifically, since the BS 200 may operate in sub-band non-overlapping full duplex (e.g., SBFD) and is capability of performing DL and UL transmission at the same time, it is possible for the UE 100 to be scheduled to perform the DL reception associated with a first resource and the UL transmission associated with a second resource, wherein the first resource and the second resource may be overlapped in time domain.

In some embodiments, the at least one indication comprises a first indication indicating the DL reception, a second indication indicating the UL transmission or the combination thereof. In some embodiments, the UE 100 may receive a first indication indicating the DL reception and a second indication indicating the UL transmission, and the DL reception indicated by the first indication and the UL transmission indicated by the second indication are overlapped in time domain. Further, the at least one indication may include a higher layer configuration, a dynamic scheduled DCI or the combination thereof. The higher layer configuration may include a radio resource control (RRC) configuration. In some embodiments, the first indication indicating the DL reception is a higher layer configuration or a dynamic scheduled DCI. In some embodiments, the second indication indicating the UL transmission is a higher layer configuration or a dynamic scheduled DCI.

In S620, the UE 100 may perform the DL reception through a first resource or the UL transmission through a second resource according to a rule. In some embodiments, the first resource and the second resource are Frequency-Division Multiplexed (FDMed) in a frequency range, and the first resource and the second resource may correspond to one or more same slots or one or more same symbols, but the first resource and the second resource are corresponding to the different frequency ranges. The frequency range of the first resource and the second resource may be a BWP, a serving cell or a range of resource blocks (RBs). Since the BS 200 may operate in sub-band full duplex and is capability of performing DL and UL transmission at the same time, it is possible for the UE 100 to receive the indications indicating the DL reception and the UL transmission which are conflict with each other in time domain. In some embodiments, in response to receiving the indications indicating the DL reception and the UL transmission which are conflict with each other in time domain, the UE 100 may perform either the DL reception or the UL transmission according to the rule. The rule defines priority of different types of the DL reception and the UL transmission. Whenever the collision of the DL reception and the UL transmission occurs in the time domain, the UE 100 may handle the collision according to the rule.

In some embodiments, the first resource is a DL resource and the second resource is a flexible resource. In some embodiments, the first resource is a flexible resource and the second resource is a UL resource. In some embodiments, the first resource is a flexible resource and the second resource is another flexible resource. In some embodiments, the first resource is a DL resource and the second resource is a UL resource.

Figure 7A:
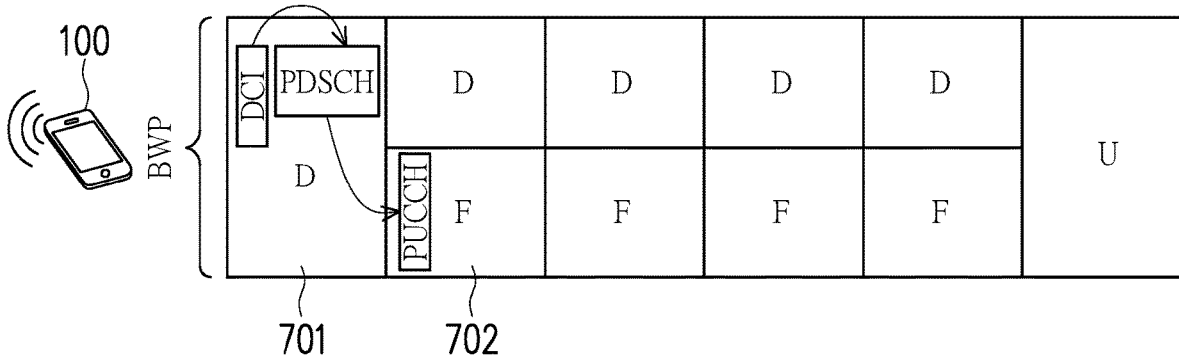
FIGS. 7A and 7B are schematic diagrams that illustrate UL delay reduction according to an exemplary embodiment of the present disclosure.
Figure 7B:
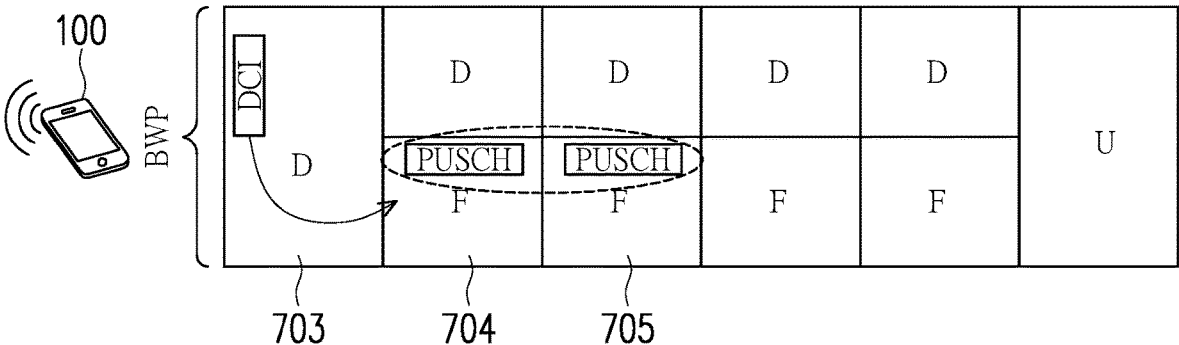

FIGS. 7A and 7B are schematic diagrams that illustrate UL delay reduction according to an exemplary embodiment of the present disclosure. In the embodiment of FIGS. 7A and 7B, the first resource may be a DL resource and the second resource may be a flexible resource. Referring to FIG. 7A, the UE 100 may receive a DCI and a PDSCH indicated by the DCI in the DL resource 701. Afterwards, the UE 100 may perform HARQ transmission by PUCCH in the flexible resource 702. Since the flexible resource 702 is configured based on full duplex operation of the BS 200, the HARQ feedback delay can be reduced. Referring to FIG. 7B, the UE 100 may receive a DCI scheduling a UL transmission. Afterwards, the UE 100 may transmit UL data by PUSCH in the flexible resource 704, and the PUSCH repetition can be performed in the flexible resource 705. That is, since the flexible resources 704 and 705 are configured based on full duplex operation of the BS 200, PUSCH repetition can be provided to enhance UL coverage.

In some embodiments, the UE 100 may perform the UL transmission through the second resource without performing the DL reception through the first resource if the DL reception in the first resource is not configured. Specifically, in some embodiments, if the DL reception in the first resource is not configured by any higher layer configuration or any DCI, the UE 100 may transmit PUSCH, PUCCH, PRACH, or SRS in the second resource in response to receiving a corresponding indication, such as a DCI format, a RAR UL grant, a fallbackRAR UL grant, or successRAR.

Alternatively, in some embodiments, if the DL reception in the first resource is not configured by any higher layer configuration or any DCI, the UE 100 may transmit a UL signal configured by a higher layer configuration.

Figure 8A:
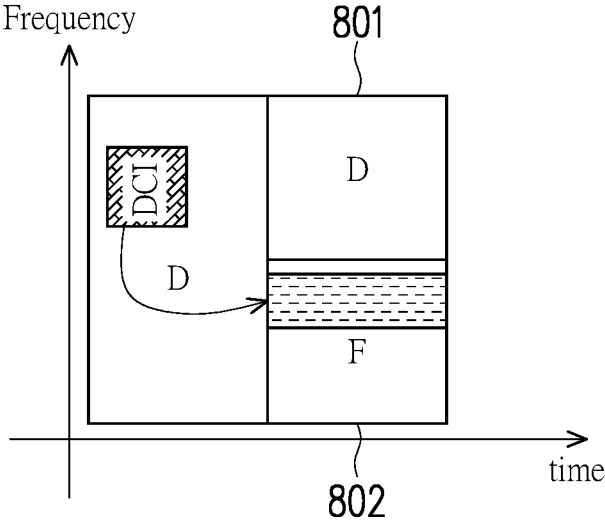
FIGS. 8A and 8B are schematic diagrams that illustrate performing the DL reception or the UL transmission without DL configuration according to an exemplary embodiment of the present disclosure.

FIG. 8A is a schematic diagram that illustrates performing the DL reception or the UL transmission without DL configuration according to an exemplary embodiment of the present disclosure. Referring to FIG. 8A, in response to no DL reception is scheduled in the first resource 801 by any higher layer configuration or any DCI, the UE 100 may perform the UL transmission which is indicated by a DCI in the second resource 802. That is, a dynamic scheduled UL transmission may be performed in the second resource 802 by the UE 100 if the UE 100 does not perform any DL reception in the first resource 801. In FIG. 8A, the first resource 801 is a DL resource, and the second resource 802 is a flexible resource. However, in other embodiments, the second resource 802 carrying the dynamic scheduled UL transmission may be a UL resource. In other embodiments, the first resource 801 in which the DL reception is not configured may be a flexible resource.

Figure 8B:
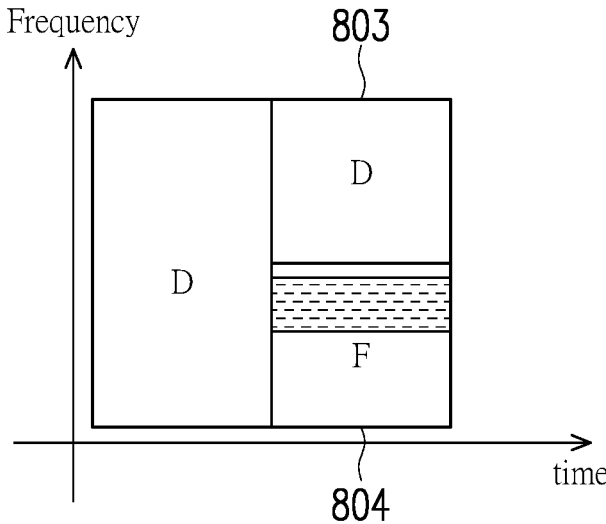

FIG. 8B is a schematic diagram that illustrates performing the DL reception or the UL transmission without DL configuration according to an exemplary embodiment of the present disclosure. Referring to FIG. 8B, in response to no DL reception is scheduled in the first resource 803 by any higher layer configuration or any DCI, the UE 100 may perform the UL transmission which is indicated by a higher layer configuration in the second resource 804. That is, a high layer configured UL transmission may be performed by the UE 100 in the second resource 804 if the UE 100 does not perform any DL reception in the first resource 803. In FIG. 8B, the first resource 803 is a DL resource, and the second resource 804 is a flexible resource. However, in other embodiments, the second resource 804 carrying the high layer configured UL transmission may be a UL resource. In other embodiments, the first resource 803 in which the DL reception is not configured may be a flexible resource.

In some embodiments, the UE 100 may receive a first indication indicating the DL reception in the first resource and a second indication indicating the UL transmission in the second resource, and the DL reception and the UL transmission conflict with each other in the time domain. The UE 100 may perform the DL reception through the first resource without performing the UL transmission through the second resource if the DL reception is a SSB reception. Specifically, no matter the UL transmission in the second resource is indicated by a higher layer configuration or a DCI, the DL reception is chosen to be performed once the DL reception in the first resource is a SSB reception.

Figure 9A:
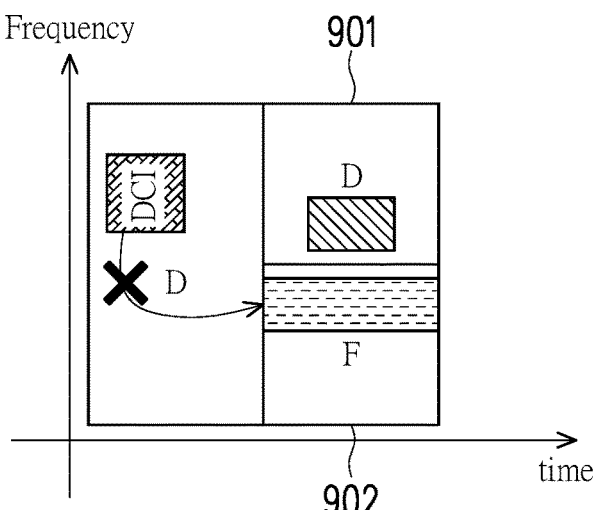
FIGS. 9A and 9B are schematic diagrams that illustrate performing the DL reception or the UL transmission if the DL reception is a SSB reception according to an exemplary embodiment of the present disclosure.

FIG. 9A is a schematic diagram that illustrates performing the DL reception or the UL transmission if the DL reception is a SSB reception according to an exemplary embodiment of the present disclosure. Referring to FIG. 9A, in response to the UE 100 receives the first indication indicating a SSB reception scheduled in the first resource 901 and at least one symbol of the SSB and the UL transmission are overlapped in time domain, the UE 100 may perform the SSB reception in the first resource 901 but not (e.g., expect to) perform UL transmission in the second resource 902 indicated by a DCI. That is, the SSB reception in the first resource 901 is performed but the dynamic scheduled UL transmission in the second resource 902 is not performed if at least one symbol of the SSB and the UL transmission are overlapped in time domain. In FIG. 9A, the first resource 901 is a DL resource, and the second resource 902 is a flexible resource. However, in other embodiments, the first resource 901 carrying the SSB may be a flexible resource. In other embodiments, the second resource 902 carrying the dynamic scheduled UL transmission may be a UL resource.

Figure 9B:
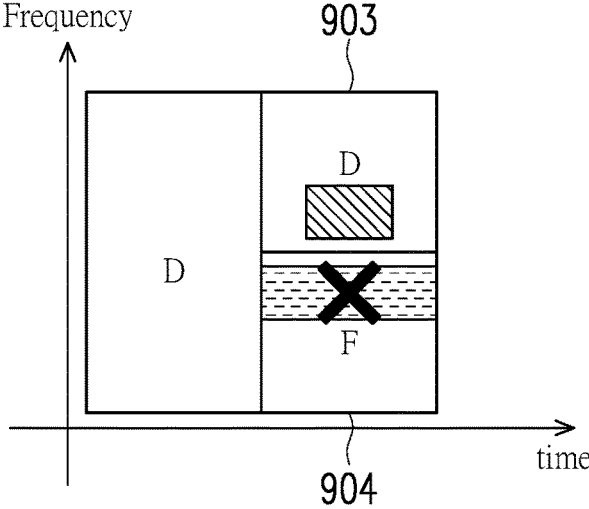

FIG. 9B is a schematic diagram that illustrates performing the DL reception or the UL transmission if the DL reception is a SSB reception according to an exemplary embodiment of the present disclosure. Referring to FIG. 9B, in response to the UE 100 receives the first indication indicating a SSB reception scheduled in the first resource 903 and at least one symbol of the SSB and the UL transmission are overlapped in time domain, the UE 100 may perform the SSB reception in the first resource 903 but not (e.g., expect to) perform UL transmission in the second resource 904 indicated by a higher layer configuration. That is, the SSB reception in the first resource 901 is performed but the higher layer scheduled UL transmission in the second resource 902 is not performed if at least one symbol of the SSB and the UL transmission are overlapped in time domain. In FIG. 9B, the first resource 903 is a DL resource, and the second resource 904 is a flexible resource. However, in other embodiments, the first resource 903 carrying the SSB may be a flexible resource. In other embodiments, the second resource 904 carrying the higher layer scheduled UL transmission may be a UL resource.

In some embodiments, the UE 100 may receive a first indication indicating the DL reception in the first resource and a second indication indicating the UL transmission in the second resource, and the DL reception and the UL transmission conflict with each other in the time domain. The UE 100 may perform the UL transmission through the second resource without performing the DL reception through the first resource if the DL reception is CORESET reception associated with a first group of search space (SS) and the second indication is a dynamic scheduled DCI. The first group of SS comprises type 1 common search space (CSS) with dedicated RRC configuration, type3 CSS, or UE specific SS. The CORESET reception associated with the first group of search space in the first resource may be indicated by a higher layer configuration. Specifically, the CORESET reception and the UL transmission may be overlapped in time domain, and the UL transmission is chosen to be performed.

Figure 10A:
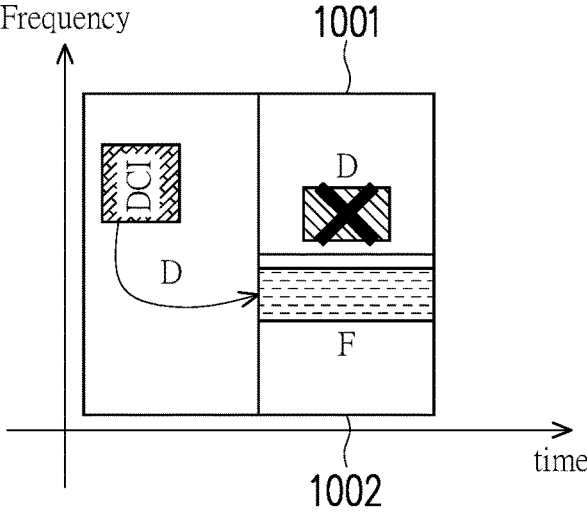
FIGS. 10A and 10B are schematic diagrams that illustrate performing the DL reception or the UL transmission if the DL reception is CORESET reception according to an exemplary embodiment of the present disclosure.

FIG. 10A is a schematic diagram that illustrates performing the DL reception or the UL transmission if the DL reception is CORESET reception according to an exemplary embodiment of the present disclosure. Referring to FIG. 10A, a CORESET reception associated with the first group of SS in the first resource 1001 is indicated by the first indication which is a higher layer configuration. In response to the UE 100 receives the second indication indicating the UL transmission in the second resource 1002 and at least one symbol of the CORESET reception and the UL transmission are overlapped in time domain, the UE 100 may perform the UL transmission in the second resource 1002 but not (e.g., expect to) receive the CORESET associated with a first group of search space. That is, the CORESET reception in the first resource 1001 is not performed but the dynamic scheduled UL transmission in the second resource 1002 is performed if the CORESET reception and the UL transmission are overlapped in time domain. In FIG. 10A, the first resource 1001 is a DL resource, and the second resource 1002 is a flexible resource. However, in other embodiments, the first resource 1001 carrying the CORESET may be a flexible resource. In other embodiments, the second resource 1002 carrying the dynamic scheduled UL transmission may be a UL resource.

In some embodiments, the UE 100 may receive a first indication indicating the DL reception in the first resource and a second indication indicating the UL transmission in the second resource, and the DL reception and the UL transmission conflict with each other in the time domain. The UE 100 may perform the DL reception through the first resource without performing the UL transmission through the second resource if the DL reception is CORESET reception associated with a second group of search space and the second indication is a dynamic scheduled DCI. The second group SS comprises type 1 CSS without dedicated RRC configuration, type 0 CSS, type OA CSS, or type 2 CSS. The CORESET reception associated with the second group of search space in the first resource may be indicated by a higher layer configuration.

Figure 10B:
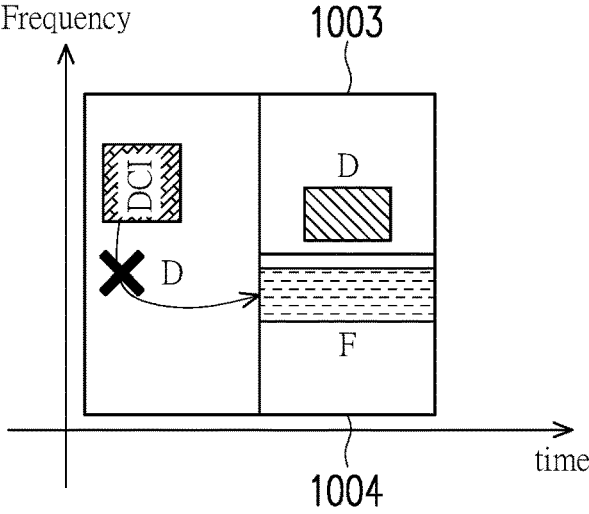

FIG. 10B is a schematic diagram that illustrates performing the DL reception or the UL transmission if the DL reception is CORESET reception according to an exemplary embodiment of the present disclosure. Referring to FIG. 10B, a CORESET reception associated with the second group of SS in the first resource 1003 is indicated by the first indication which is a higher layer configuration. In response to the UE 100 receives the second indication indicating the UL transmission in the second resource 1004 and at least one symbol of the CORESET reception and the UL transmission are overlapped in time domain, the UE 100 may perform the CORESET reception associated with the second group of SS in the first resource 1003 but not (e.g., expect to) perform the UL transmission in the second resource 1004. That is, the CORESET reception in the first resource 1003 is performed but the dynamic scheduled UL transmission in the second resource 1004 is not performed if the CORESET reception and the UL transmission are overlapped in time domain. In FIG. 10B, the first resource 1003 is a DL resource, and the second resource 1004 is a flexible resource. However, in other embodiments, the first resource 1003 carrying the CORESET may be a flexible resource. In other embodiments, the second resource 1004 carrying the dynamic scheduled UL transmission may be a UL resource.

In some embodiments, the UE 100 may receive a first indication indicating the DL reception in the first resource and a second indication indicating the UL transmission in the second resource, and the DL reception and the UL transmission conflict with each other in the time domain. The UE 100 may perform the UL transmission through the second resource without performing the DL reception through the first resource if the first indication is a higher layer configuration and the second indication is a dynamic scheduled DCI.

Figure 11:
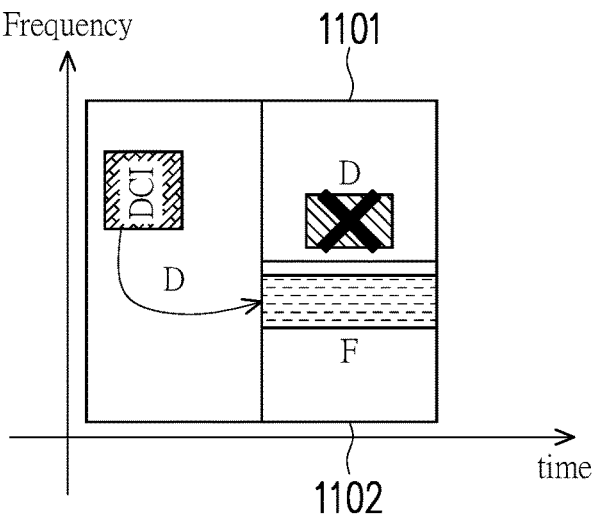
FIG. 11 is a schematic diagram that illustrates performing the DL reception or the UL transmission if the DL reception is configured by higher layer according to an exemplary embodiment of the present disclosure.

FIG. 11 is a schematic diagram that illustrates performing the DL reception or the UL transmission if the DL reception is configured by higher layer according to an exemplary embodiment of the present disclosure. Referring to FIG. 11, the DL reception in the first resource 1101 is indicated by the first indication which is a higher layer configuration, and the UL transmission in the second resource 1102 is indicated by the second indication which is a dynamic scheduled DCI. In response to at least one symbol of the DL reception and the UL transmission are overlapped with each other in time domain, the UE 100 may perform the UL transmission in the second resource 1102 but not (e.g., expect to) perform the DL reception in the first resource 1101. That is, the higher layer scheduled DL reception in the first resource 1101 is not performed but the dynamic scheduled UL transmission in the second resource 1102 is performed if the DL reception and the UL transmission are overlapped with each other in time domain. In FIG. 11, the first resource 1101 is a DL resource, and the second resource 1102 is a flexible resource. However, in other embodiments, the first resource 1101 carrying the higher layer scheduled DL reception may be a flexible resource. In other embodiments, the second resource 1102 carrying the dynamic scheduled UL transmission may be a UL resource.

In some embodiments, the UE 100 may receive a first indication indicating the DL reception in the first resource and a second indication indicating the UL transmission in the second resource, and the DL reception and the UL transmission conflict with each other in the time domain. The UE 100 may perform the DL reception through the first resource without performing the UL transmission through the second resource if the first indication is a dynamic scheduled DCI and the second indication is a higher layer configuration.

Figure 12:
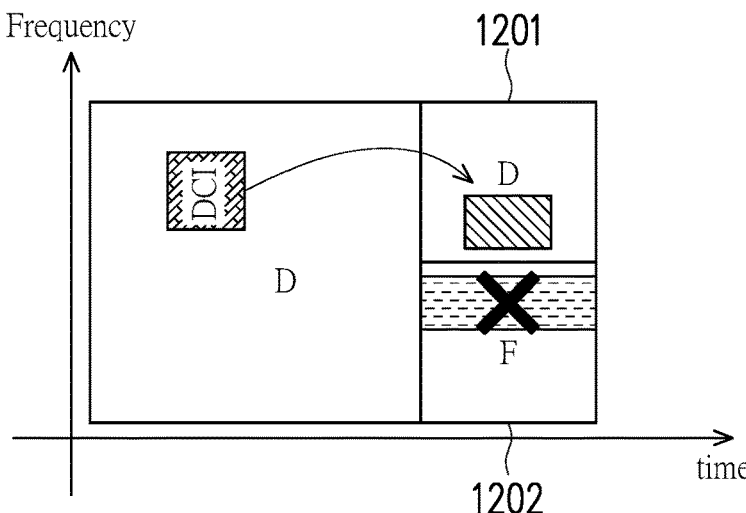
FIG. 12 is a schematic diagram that illustrates performing the DL reception or the UL transmission if the DL reception is a dynamic DL reception according to an exemplary embodiment of the present disclosure.

FIG. 12 is a schematic diagram that illustrates performing the DL reception or the UL transmission if the DL reception is a dynamic DL reception according to an exemplary embodiment of the present disclosure. Referring to FIG. 12, the DL reception in the first resource 1201 is indicated by the first indication which is a dynamic scheduled DCI, and the UL transmission in the second resource 1202 is indicated by the second indication which is a higher layer configuration. In response to at least one symbol of the DL reception and the UL transmission are overlapped with each other in time domain, the UE 100 may perform the DL reception in the first resource 1201 but not (e.g., expect to) perform the UL transmission in the second resource 1202. That is, the higher layer scheduled UL transmission in the second resource 1202 is not performed but the dynamic scheduled DL reception in the first resource 1201 is performed if the DL reception and the UL transmission are overlapped with each other in time domain. In FIG. 12, the first resource 1201 is a DL resource, and the second resource 1202 is a flexible resource. However, in other embodiments, the first resource 1201 carrying the dynamic scheduled DL reception may be a flexible resource. In other embodiments, the second resource 1202 carrying the higher layer scheduled UL transmission may be a UL resource.

In some embodiments, the UE 100 may receive a first indication indicating the DL reception in the first resource and a second indication indicating the UL transmission in the second resource, and the DL reception and the UL transmission conflict with each other in the time domain. If the first indication is a dynamic scheduled DCI and the second indication is another dynamic scheduled DCI, the UE 100 may perform either the DL reception or the UL transmission by comparing a priority parameter indicated by the first indication with the other priority parameter indicated by the second indication. The UE 100 may receive the DL reception with a first priority and may not (e.g., expect to) transmit the UL transmission with a second priority in response to the first priority is higher than the second priority if at least one symbol of the DL signal and the UL signal is overlapped in time domain. Alternatively, the UE 100 may transmit the UL transmission with a second priority and may not (e.g., expect to) receive the DL reception with a first priority in response to the second priority is higher than the first priority if at least one symbol of the DL signal and the UL signal is overlapped in time domain.

In some embodiments, when the first indication is a dynamic scheduled DCI and the second indication is another dynamic scheduled DCI and at least one symbol of the DL signal and the UL signal is overlapped in time domain, the UE 100 may perform the DL reception through the first resource without performing the UL transmission through the second resource if a first priority indicated by the first indication is higher than a second priority indicated by the second indication.

Figure 13:
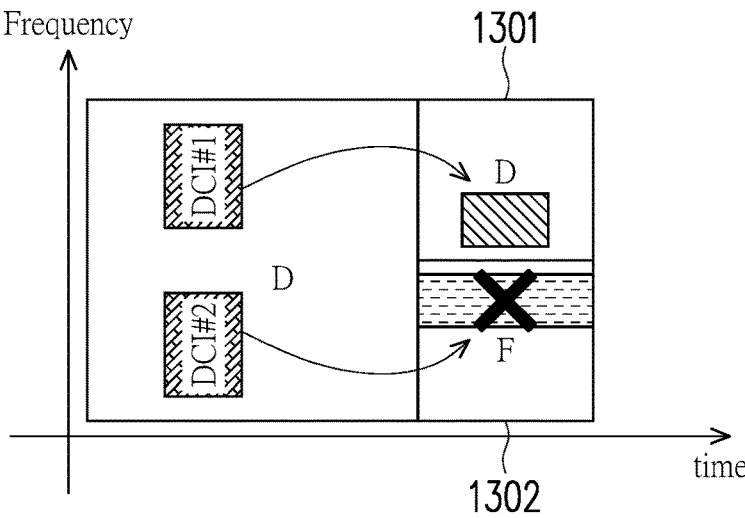
FIG. 13 is a schematic diagram that illustrates performing the DL reception or the UL transmission if the DL reception is a dynamic DL reception and the UL transmission is a dynamic UL transmission according to an exemplary embodiment of the present disclosure.

FIG. 13 is a schematic diagram that illustrates performing the DL reception or the UL transmission if the DL reception is a dynamic DL reception and the UL transmission is a dynamic UL transmission according to an exemplary embodiment of the present disclosure. Referring to FIG. 13, the DL reception in the first resource 1301 is indicated by the first indication which is a dynamic scheduled DCI, and the UL transmission in the second resource 1302 is indicated by the second indication which is a dynamic scheduled DCI. When at least one symbol of the DL reception and the UL transmission are overlapped with each other in time domain, the UE 100 may perform the DL reception in the first resource 1301 but not (e.g., expect to) perform the UL transmission in the second resource 1302 in response to determining a first priority '1' indicated by the first indication is higher than a second priority '0' indicated by the second indication. In FIG. 13, the first resource 1301 is a DL resource, and the second resource 1302 is a flexible resource. However, in other embodiments, the first resource 1301 carrying the dynamic scheduled DL reception may be a flexible resource. In other embodiments, the second resource 1302 carrying the dynamic scheduled UL transmission may be a UL resource.

In some embodiments, the UE 100 may receive a first indication indicating the DL reception in the first resource and a second indication indicating the UL transmission in the second resource, and the DL reception and the UL transmission conflict with each other in the time domain. If the first indication is a dynamic scheduled DCI and the second indication is another dynamic scheduled DCI, the UE 100 may perform either the DL reception or the UL transmission by comparing a priority parameter indicated by the first indication with the other priority parameter indicated by the second indication. If a first priority indicated by the first indication is identical with a second priority indicated by the second indication, the UE 100 may perform either the DL reception or the UL transmission by comparing the receiving timing of the first indication and the receiving timing of the second indication. If at least one symbol of the DL reception and the UL transmission are overlapped in time domain and the first priority of the DL reception and the second priority of the UL reception are identical, the UE 100 may receive the DL reception and may not (e.g., expect to) transmit the UL transmission in response to determining the receiving timing of the first indication which is a DCI is later than the second indication which is another DCI. Alternatively, if at least one symbol of the DL reception and the UL transmission are overlapped in time domain and the first priority of the DL reception and the second priority of the UL reception are identical, the UE 100 may perform the UL transmission and may not (e.g., expect to) perform the DL reception in response to determining the receiving timing of the second indication which is s DCI is later than the first indication which is another DCI.

In some embodiments, when the first indication is a dynamic scheduled DCI and the second indication is another dynamic scheduled DCI and at least one symbol of the DL signal and the UL signal is overlapped in time domain, the UE 100 may perform the DL reception through the first resource without performing the UL transmission through the second resource if a receiving time of the first indication is later than a receiving time of the second indication.

Figure 14:
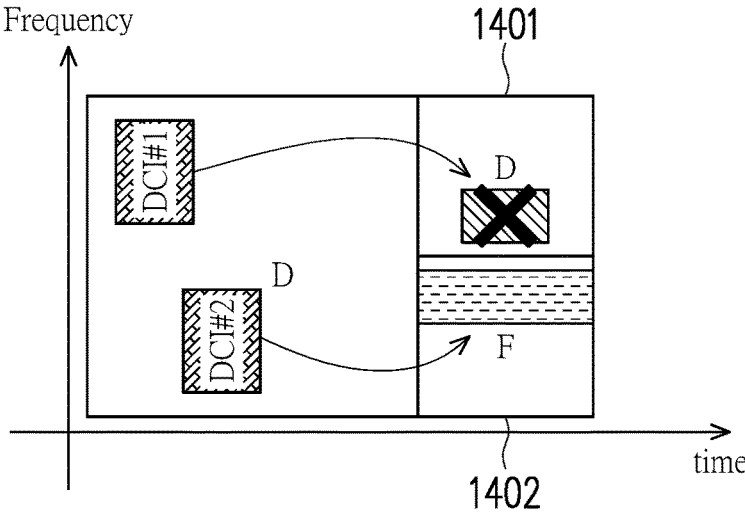
FIG. 14 is a schematic diagram that illustrates performing the DL reception or the UL transmission if the DL reception is a dynamic DL reception and the UL transmission is a dynamic UL transmission according to an exemplary embodiment of the present disclosure.

FIG. 14 is a schematic diagram that illustrates performing the DL reception or the UL transmission if the DL reception is a dynamic DL reception and the UL transmission is a dynamic UL transmission according to an exemplary embodiment of the present disclosure. Referring to FIG. 14, the DL reception in the first resource 1401 is indicated by the first indication which is a dynamic scheduled DCI, and the UL transmission in the second resource 1402 is indicated by the second indication which is a dynamic scheduled DCI. When at least one symbol of the DL reception and the UL transmission are overlapped with each other in time domain, the UE 100 may perform the UL transmission in the second resource 1402 but not (e.g., expect to) perform the DL reception in the first resource 1401 in response to determining the receiving timing of the second indication with the second priority '1' is later than the receiving timing of the first indication with the first priority '1'. In FIG. 14, the first resource 1401 is a DL resource, and the second resource 1402 is a flexible resource. However, in other embodiments, the first resource 1401 carrying the dynamic scheduled DL reception may be a flexible resource. In other embodiments, the second resource 1402 carrying the dynamic scheduled UL transmission may be a UL resource.

Figure 15:
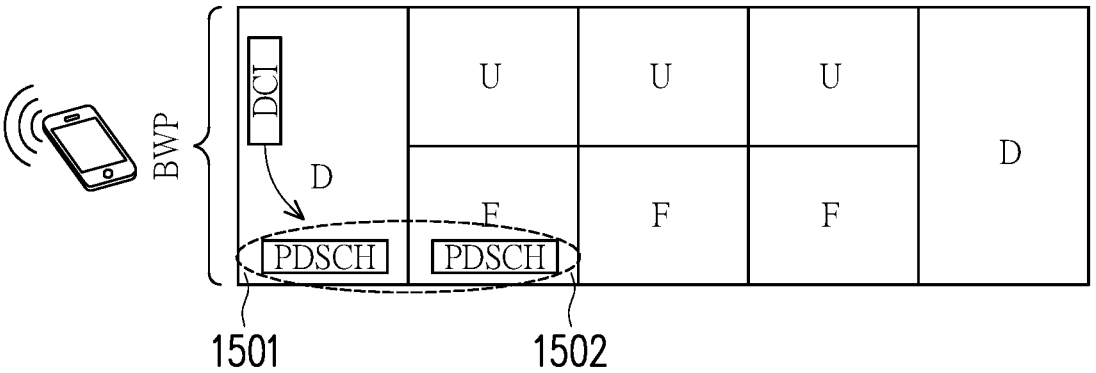
FIG. 15 is a schematic diagram that illustrates fast DL reception according to an exemplary embodiment of the present disclosure.

FIG. 15 is a schematic diagram that illustrates fast DL reception according to an exemplary embodiment of the present disclosure. Referring to FIG. 15, the first resource may be a UL resource and the second resource may be a flexible resource. The UE 100 may receive a DCI and a PDSCH indicated by the DCI in the DL resource 1501. Afterwards, the PDSCH repetition can be performed in the flexible resource 1502. Since the flexible resource 1502 is configured based on full duplex operation of the BS 200, the delay of PDSCH repetition can be reduced and the DL coverage is enhanced.

In some embodiments, the UE 100 may perform the DL reception through the first resource without performing the UL transmission through the second resource if the UL transmission in the second resource is not configured. Specifically, in some embodiments, if the UL transmission in the second resource is not configured by any higher layer configuration or any DCI, the UE 100 may receive the DL reception in the first resource in response to receiving a corresponding indication, such as a DCI format. Alternatively, in some embodiments, if the UL transmission in the second resource is not configured by any higher layer configuration or any DCI, the UE 100 may receive the DL reception configured by a higher layer configuration.

Figure 16A:
FIGS. 16A and 16B are schematic diagrams that illustrate performing the DL reception or the UL transmission without UL configuration according to an exemplary embodiment of the present disclosure.
Figure 16A:
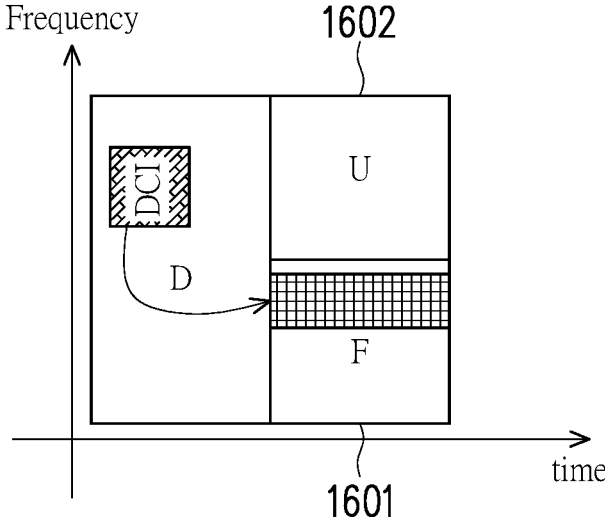

FIG. 16A is a schematic diagram that illustrates performing the DL reception or the UL transmission without UL transmission according to an exemplary embodiment of the present disclosure. Referring to FIG. 16A, in response to no UL transmission is scheduled in the second resource 1602 by any higher layer configuration or any DCI, the UE 100 may perform the DL reception which is indicated by a DCI in the second resource 1601. That is, a dynamic scheduled DL reception may be performed in the second resource 1602 by the UE 100 if the UE 100 does not perform any UL transmission in the first resource 1601. In FIG. 16A, the first resource 1601 is a flexible resource, and the second resource 1602 is a UL resource. However, in other embodiments, the first resource 1601 carrying the dynamic scheduled DL reception may be a DL resource. In other embodiments, the second resource 1602 in which the UL transmission is not configured may be a flexible resource.

Figure 16B:
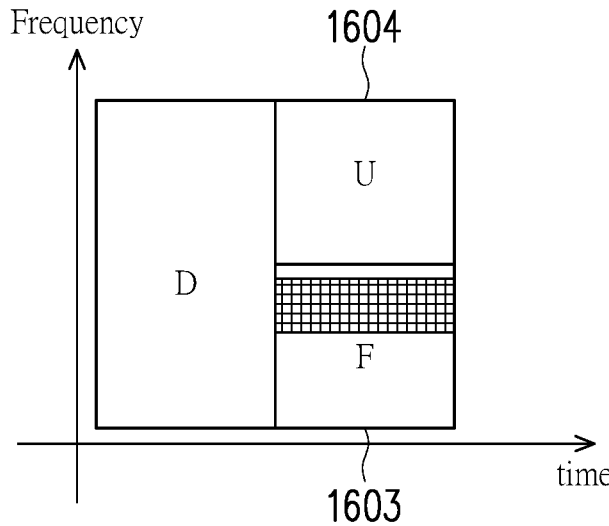

FIG. 16B is a schematic diagram that illustrates performing the DL reception or the UL transmission without UL transmission according to an exemplary embodiment of the present disclosure. Referring to FIG. 16B, in response to no UL transmission is scheduled in the second resource 1604 by any higher layer configuration or any DCI, the UE 100 may perform the DL reception which is indicated by a higher layer configuration in the second resource 1603. That is, a higher layer configured DL reception may be performed by the UE 100 in the first resource 1603 if the UE 100 does not perform any UL reception in the second resource 1604. In FIG. 16B, the first resource 1603 is a flexible resource, and the second resource 1604 is a UL resource. However, in other embodiments, the first resource 1603 carrying the higher layer scheduled DL reception may be a DL resource. In other embodiments, the second resource 1604 in which the UL transmission is not configured may be a flexible resource.

In some embodiments, the UE 100 may receive a first indication indicating the DL reception in the first resource and a second indication indicating the UL transmission in the second resource, and the DL reception and the UL transmission conflict with each other in the time domain. The UE 100 may perform the UL transmission through the second resource without performing the DL reception through the first resource if the UL transmission is a Scheduling Request (SR). Specifically, no matter the DL transmission in the first resource is indicated by a higher layer configuration or a DCI, the UL transmission is chosen to be performed once the UL transmission in the second resource is a Scheduling Request.

Figure 17A:
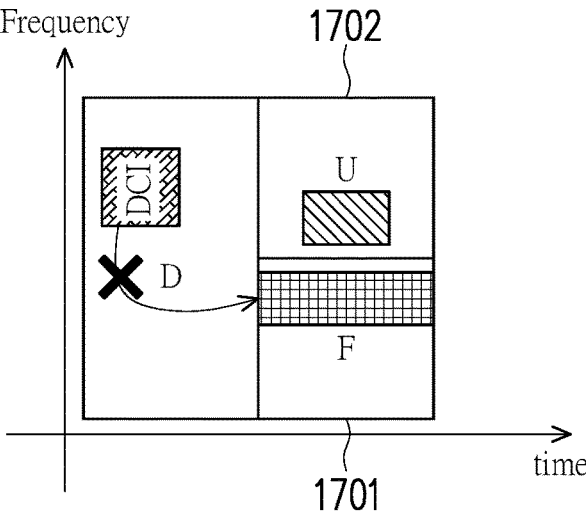
FIGS. 17A and 17B are schematic diagrams that illustrate performing the DL reception or the UL transmission if the UL transmission is a SR according to an exemplary embodiment of the present disclosure.

FIG. 17A is a schematic diagram that illustrates performing the DL reception or the UL transmission if the UL transmission is a SR according to an exemplary embodiment of the present disclosure. Referring to FIG. 17A, in response to the UE 100 receives the second indication indicating a SR scheduled in the second resource 1702 and at least one symbol of the SR and the DL reception are overlapped with each other in time domain, the UE 100 may perform the SR transmission in the second resource 1702 but not (e.g., expect to) perform DL reception in the first resource 1701 indicated by a DCI. That is, the SR transmission in the second resource 1702 is performed but the dynamic scheduled DL reception in the first resource 1701 is not performed if at least one symbol of the SR and the DL reception are overlapped in time domain. In FIG. 17A, the first resource 1701 is a flexible resource, and the second resource 1702 is a UL resource. However, in other embodiments, the first resource 1701 carrying the dynamic scheduled DL reception may be a DL resource. In other embodiments, the second resource 1702 carrying the SR may be a flexible resource.

Figure 17B:
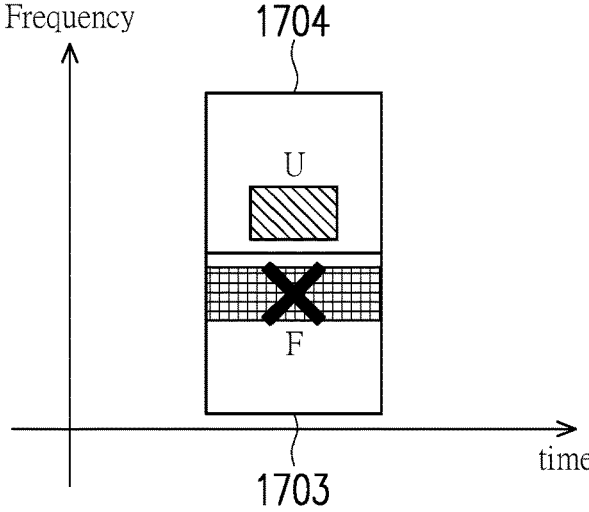

FIG. 17B is a schematic diagram that illustrates performing the DL reception or the UL transmission if the UL transmission is a SR according to an exemplary embodiment of the present disclosure. Referring to FIG. 17B, in response to the UE 100 receives the second indication indicating a SR scheduled in the second resource 1704 and at least one symbol of the SR and the DL reception are overlapped with each other in time domain, the UE 100 may perform the SR transmission in the second resource 1704 but not (e.g., expect to) perform DL reception in the first resource 1703 indicated by a higher layer configuration. That is, the SR transmission in the second resource 1704 is performed but the higher layer scheduled DL reception in the first resource 1703 is not performed if at least one symbol of the SR and the DL reception are overlapped in time domain. In FIG. 17B, the first resource 1701 is a flexible resource, and the second resource 1702 is a UL resource. However, in other embodiments, the first resource 1701 carrying the dynamic scheduled DL reception may be a DL resource. In other embodiments, the second resource 1702 carrying the SR may be a flexible resource.

In some embodiments, the UE 100 may receive a first indication indicating the DL reception in the first resource and a second indication indicating the UL transmission in the second resource, and the DL reception and the UL transmission conflict with each other in the time domain. The UE 100 may perform the UL transmission through the second resource without performing the DL reception through the first resource if the UL transmission is a Message 1 (Msg1) or a Message 3 (Msg3) of random access (RA) procedure. Specifically, no matter the DL transmission in the first resource is indicated by a higher layer configuration or a DCI, the UL transmission is chosen to be performed once the UL transmission in the second resource is a Msg1 or a Msg3 of RA procedure.

Figure 18A:
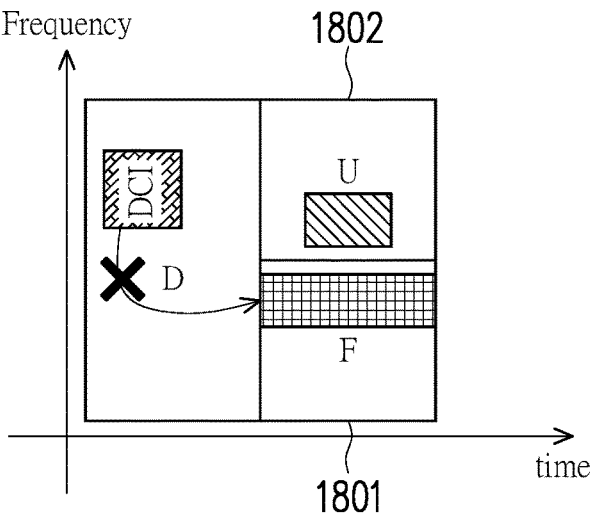
FIGS. 18A and 18B are schematic diagrams that illustrate performing the DL reception or the UL transmission if the UL transmission is a RA message according to an exemplary embodiment of the present disclosure.

FIG. 18A is a schematic diagram that illustrates performing the DL reception or the UL transmission if the UL transmission is a RA message according to an exemplary embodiment of the present disclosure. Referring to FIG. 18A, in response to the UE 100 receives the second indication indicating a Msg1 or a Msg3 of RA procedure scheduled in the second resource 1802 and at least one symbol of the RA message and the DL reception are overlapped with each other in time domain, the UE 100 may transmit the Msg1 or the Msg3 of RA procedure in the second resource 1802 but not (e.g., expect to) perform DL reception in the first resource 1801 indicated by a DCI. That is, the Msg1 or the Msg3 of RA procedure in the second resource 1802 is transmitted but the dynamic scheduled DL reception in the first resource 1801 is not performed if at least one symbol of the RA message and the DL reception are overlapped in time domain. In FIG. 18A, the first resource 1801 is a flexible resource, and the second resource 1802 is a UL resource. However, in other embodiments, the first resource 1801 carrying the dynamic scheduled DL reception may be a DL resource. In other embodiments, the second resource 1802 carrying the RA message may be a flexible resource.

Figure 18B:
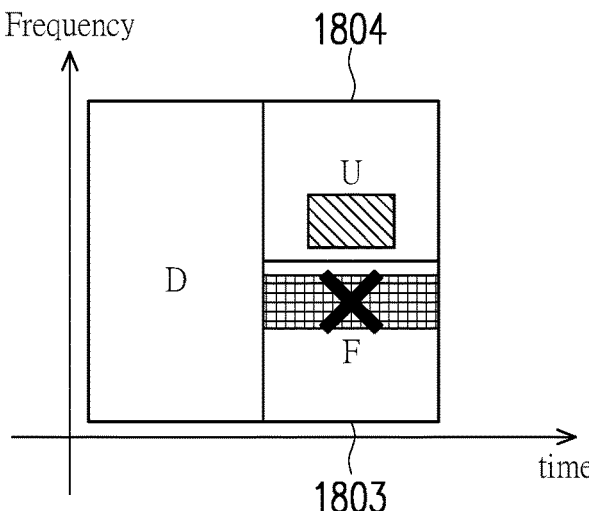

FIG. 18B is a schematic diagram that illustrates performing the DL reception or the UL transmission if the UL transmission is a RA message according to an exemplary embodiment of the present disclosure. Referring to FIG. 18B, in response to the UE 100 receives the second indication indicating a Msg1 or a Msg3 of RA procedure scheduled in the second resource 1804 and at least one symbol of the RA message and the DL reception are overlapped with each other in time domain, the UE 100 may transmit the Msg1 or the Msg3 of RA procedure in the second resource 1804 but not (e.g., expect to) perform DL reception in the first resource 1803 indicated by a higher layer configuration. That is, the Msg1 or the Msg3 of RA procedure in the second resource 1804 is transmitted but the higher layer scheduled DL reception in the first resource 1803 is not performed if at least one symbol of the RA message and the DL reception are overlapped in time domain. In FIG. 18B, the first resource 1803 is a flexible resource, and the second resource 1804 is a UL resource. However, in other embodiments, the first resource 1803 carrying the dynamic scheduled DL reception may be a DL resource. In other embodiments, the second resource 1804 carrying the RA message may be a flexible resource.

Figure 19:
FIG. 19 is a schematic diagram that illustrates performing the DL reception or the UL transmission if the UL transmission is configured by higher layer according to an exemplary embodiment of the present disclosure.
Figure 19:
Figure 19:
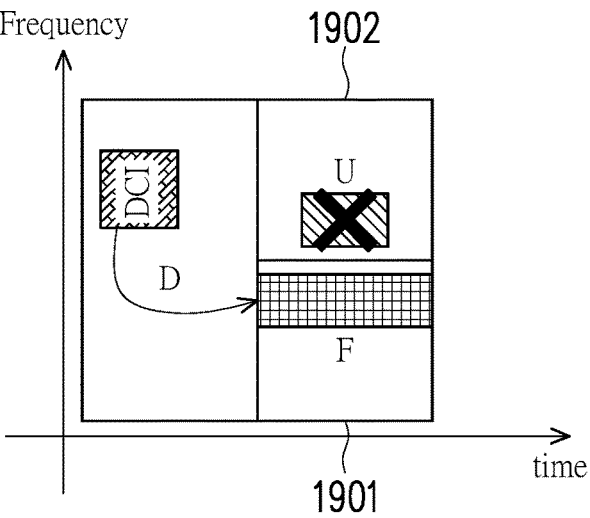

FIG. 19 is a schematic diagram that illustrates performing the DL reception or the UL transmission if the UL transmission is configured by higher layer according to an exemplary embodiment of the present disclosure. Referring to FIG. 19, the DL reception in the first resource 1901 is indicated by the first indication which is a dynamic scheduled DCI, and the UL transmission in the second resource 1902 is indicated by the second indication which is a higher layer configuration. In response to at least one symbol of the DL reception and the UL transmission are overlapped with each other in time domain, the UE 100 may perform the DL reception in the first resource 1901 but not (e.g., expect to) perform the UL transmission in the second resource 1902. That is, the higher layer scheduled UL transmission in the second resource 1902 is not performed but the dynamic scheduled DL reception in the first resource 1901 is performed if the DL reception and the UL transmission are overlapped with each other in time domain. In FIG. 19, the first resource 1901 is a flexible resource, and the second resource 1902 is a UL resource. However, in other embodiments, the first resource 1901 carrying the dynamic scheduled DL reception may be a DL resource. In other embodiments, the second resource 1902 carrying the higher layer scheduled UL transmission may be a flexible resource.

Figure 20:
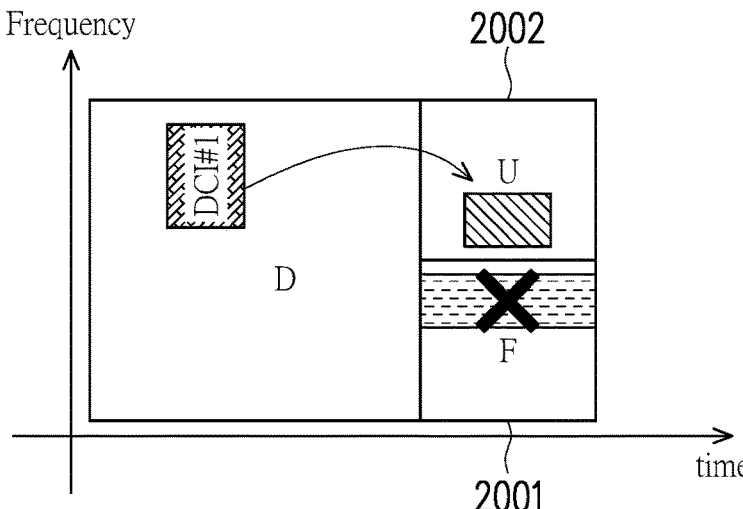
FIG. 20 is a schematic diagram that illustrates performing the DL reception or the UL transmission if the UL transmission is a dynamic UL transmission according to an exemplary embodiment of the present disclosure.

FIG. 20 is a schematic diagram that illustrates performing the DL reception or the UL transmission if the UL transmission is a dynamic UL transmission according to an exemplary embodiment of the present disclosure. Referring to FIG. 20, the DL reception in the first resource 2001 is indicated by the first indication which is a higher layer configuration, and the UL transmission in the second resource 2002 is indicated by the second indication which is a dynamic scheduled DCI. In response to at least one symbol of the DL reception and the UL transmission are overlapped with each other in time domain, the UE 100 may perform the UL transmission in the second resource 2002 but not (e.g., expect to) perform the DL reception in the first resource 2001. That is, the higher layer scheduled DL reception in the first resource 2001 is not performed but the dynamic scheduled UL transmission in the second resource 2002 is performed if the DL reception and the UL transmission are overlapped with each other in time domain. In FIG. 20, the first resource 2001 is a flexible resource, and the second resource 2002 is a UL resource. However, in other embodiments, the first resource 2001 carrying the higher layer scheduled DL reception may be a DL resource. In other embodiments, the second resource 2002 carrying the dynamic scheduled UL transmission may be a flexible resource.

In some embodiments, if the first indication is a dynamic scheduled DCI and the second indication is another dynamic scheduled DCI, the UE 100 may perform either the DL reception or the UL transmission by comparing a priority parameter indicated by the first indication with the other priority parameter indicated by the second indication. In some embodiments, when the first indication is a dynamic scheduled DCI and the second indication is another dynamic scheduled DCI and at least one symbol of the DL signal and the UL signal is overlapped in time domain, the UE 100 may perform the UL transmission through the second resource without performing the DL reception through the first resource if a second priority indicated by the second indication is higher than a first priority indicated by the first indication.

Figure 21A:
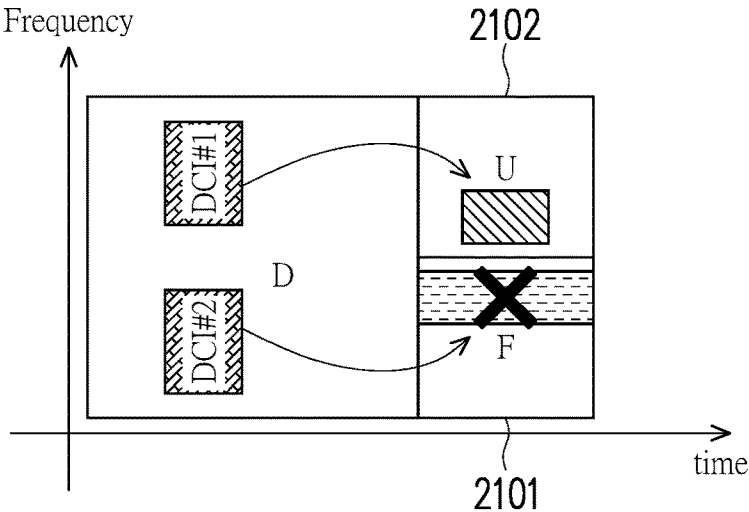
FIGS. 21A and 21B are schematic diagrams that illustrate performing the DL reception or the UL transmission if the DL reception is a dynamic DL reception and the UL transmission is a dynamic UL transmission according to an exemplary embodiment of the present disclosure.

FIG. 21A is a schematic diagram that illustrates performing the DL reception or the UL transmission if the DL reception is a dynamic DL reception and the UL transmission is a dynamic UL transmission according to an exemplary embodiment of the present disclosure. Referring to FIG. 21A, the DL reception in the first resource 2101 is indicated by the first indication which is a dynamic scheduled DCI, and the UL transmission in the second resource 2102 is indicated by the second indication which is a dynamic scheduled DCI. When at least one symbol of the DL reception and the UL transmission are overlapped with each other in time domain, the UE 100 may perform the UL transmission in the second resource 2102 but not (e.g., expect to) perform the DL reception in the first resource 2101 in response to determining a second priority '1' indicated by the second indication is higher than a first priority '0' indicated by the first indication. In FIG. 21A, the first resource 2101 is a flexible resource, and the second resource 2102 is a UL resource. However, in other embodiments, the first resource 2101 carrying the dynamic scheduled DL reception may be a DL resource. In other embodiments, the second resource 2102 carrying the dynamic scheduled UL transmission may be a flexible resource.

In some embodiments, if the first indication is a dynamic scheduled DCI and the second indication is another dynamic scheduled DCI and a first priority indicated by the first indication is identical with a second priority indicated by the second indication, the UE 100 may perform either the DL reception or the UL transmission by comparing the receiving timing of the first indication and the receiving timing of the second indication. In some embodiments, when the first indication is a dynamic scheduled DCI and the second indication is another dynamic scheduled DCI and at least one symbol of the DL signal and the UL signal is overlapped in time domain, the UE 100 may perform the UL transmission through the second resource without performing the DL reception through the first resource if a receiving time of the second indication is later than a receiving time of the first indication.

Figure 21B:
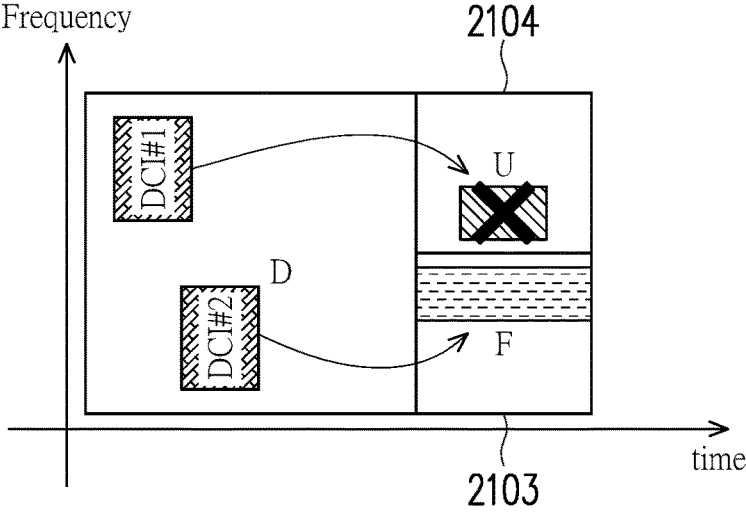

FIG. 21B is a schematic diagram that illustrates performing the DL reception or the UL transmission if the DL reception is a dynamic DL reception and the UL transmission is a dynamic UL transmission according to an exemplary embodiment of the present disclosure. Referring to FIG. 21B, the DL reception in the first resource 2103 is indicated by the first indication which is a dynamic scheduled DCI, and the UL transmission in the second resource 2104 is indicated by the second indication which is a dynamic scheduled DCI. When at least one symbol of the DL reception and the UL transmission are overlapped with each other in time domain, the UE 100 may perform the DL reception in the first resource 2103 but not (e.g., expect to) perform the UL transmission in the second resource 2104 in response to determining the receiving timing of the first indication with the first priority '1' is later than the receiving timing of the second indication with the first priority '1'. In FIG. 21B, the first resource 2103 is a flexible resource, and the second resource 2104 is a UL resource. However, in other embodiments, the first resource 2103 carrying the dynamic scheduled DL reception may be a DL resource. In other embodiments, the second resource 2104 carrying the dynamic scheduled UL transmission may be a flexible resource.

In some embodiments, the UE 100 may perform BWP switching for UL transmission to reduce the latency of the UL transmission (e.g. HARQ feedback). The embodiments related to the BWP switching for UL transmission may be introduced in the following paragraphs.

In some embodiments, the UE 100 may receive at least one indication indicating at least one of a DL reception and a UL transmission. The at least one indication comprises a first indication indicating the DL reception and a second indication indicating the UL transmission. That is, the UE 100 may receive a first indication indicating the DL reception in the first resource and a second indication indicating the UL transmission in the second resource. It should be noted that, in some embodiments, the second indication is a field of the first indication. The first resource is a first BWP, and the second resource is a second BWP.

In some embodiments, after performing the DL reception through the first BWP indicated by the first indication, the UE 100 may perform the UL transmission through the second BWP indicated by the second indication. The UL transmission is a HARQ transmission. That is, the UL transmission in the second BWP may include HARQ-ACK or HARQ-NACK. The UE 100 may perform a PDSCH reception in a first BWP indicated by the first indication which is DL DCI format, and the such DL DCI format may comprise a field to inform a second BWP by which the UE 100 could transmit HARQ feedback for the PDSCH reception. For example, the field in the such DL DCI format may be a BWP indicator for HARQ feedback, and the BWP indicator may be a BWP ID.

In some embodiments, after the UL transmission (e.g., HARQ transmission), the UE 100 may perform BWP switching from the second BWP to the first BWP. In some embodiments, after the UL transmission, the UE 100 may perform BWP switching from the second BWP to a third BWP indicated by the first indication. That is, after the UL transmission indicated by the second indication in the second BWP is accomplished, the UE 100 may perform BWP switching from the second BWP back to the first BWP automatically without any indication. Alternatively, after the UL transmission indicated by the second indication in the second BWP is accomplished, the UE 100 may perform BWP switching from the second BWP back to the first BWP which is indicated by the first indication.

Figure 22:
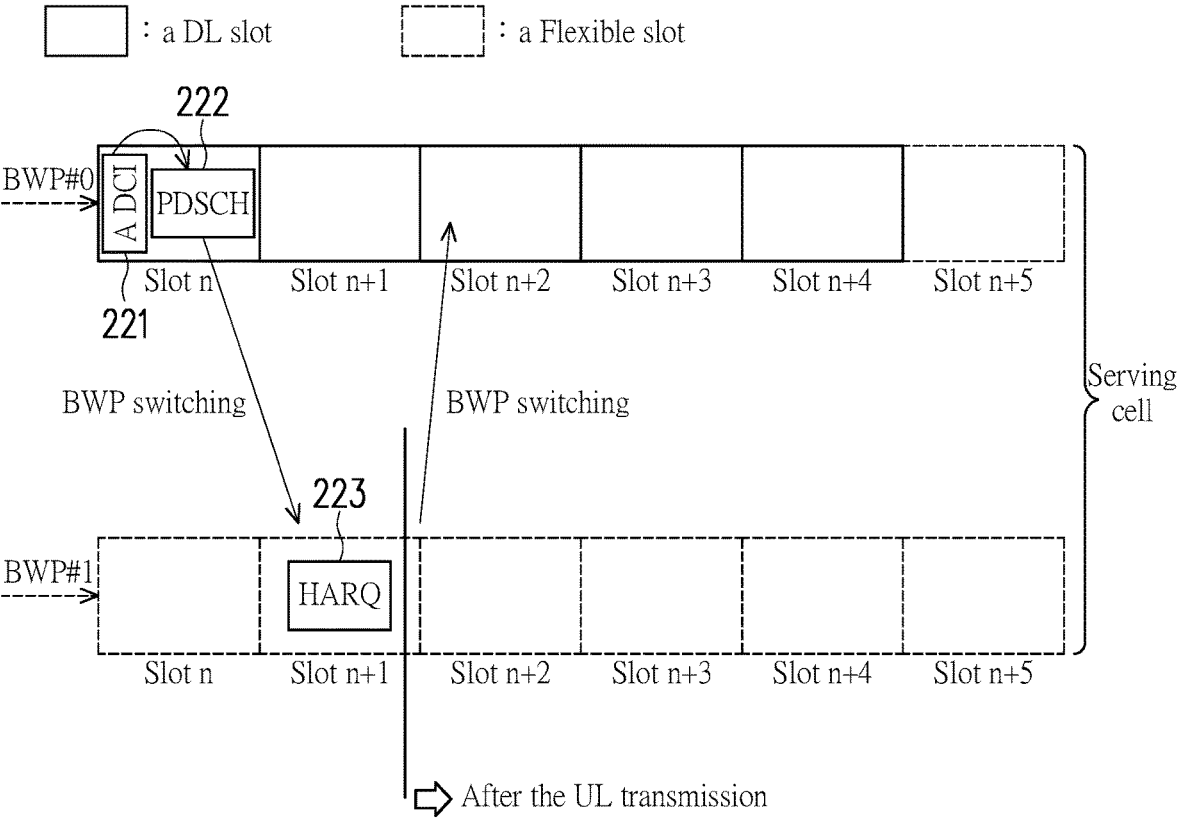
FIG. 22 is a schematic diagram that illustrates explicit BWP switching for HARQ according to a DCI according to an exemplary embodiment of the present disclosure.

FIG. 22 is a schematic diagram that illustrates explicit BWP switching for HARQ according to a DCI according to an exemplary embodiment of the present disclosure. Referring to FIG. 22, the UE 100 may receive the PDSCH 232 indicated by the DCI 231 in Slot #n over the BWP #0. A field (i.e. the second indication) of the DCI 231 (i.e. the first indication) may include a BWP indicator indicating BWP #1 for HARQ feedback transmission. Therefore, the UE 100 may perform BWP switching from BWP #0 to BWP #1, so as to perform HARQ feedback transmission corresponding to the PDSCH 232 by using BWP #1. The HARQ feedback 223 may be transmitted in Slot #(n+1) by using the BWP #1. After the HARQ feedback 223 is transmitted, the UE 100 may perform BWP switch again from BWP #1 to the BWP #0 which is indicated by another field of the DCI 231. The DCI 231 includes a field indicating a target BWP for HARQ transmission, and the DCI 231 also includes another field indicating another target BWP which should be activated after the HARQ transmission In some embodiments, a time location for performing the HARQ transmission is informed to the UE 100, and thus the target BWP for HARQ transmission may be indicated by the such time location. In some embodiments, the second BWP is identical with the first BWP if a time location of the UL transmission within the first BWP is a UL resource, and the time location of the UL transmission is indicated by the second indication. That is, the UE 100 may not need to perform BWP switching for HARQ transmission if the time location of the UL transmission indicated by the second indication is corresponding to a UL resource in the current activated BWP.

In some embodiments, the second BWP is different from the first BWP if a time location of the UL transmission within the first BWP is a DL resource and the time location of the UL transmission within the second BWP is a UL resource, and the time location of the UL transmission is indicated by the second indication. That is, the UE 100 may perform BWP switching for HARQ transmission if the time location of the UL transmission indicated by the second indication is corresponding to a DL resource in the current activated BWP. Further, the UE 100 may perform BWP switching to the second BWP in which a UL resource is corresponding to the time location of the UL transmission. In some embodiments, the second BWP has a lowest BWP ID among a plurality of candidate BWPs. That is, if there are a plurality of candidate BWPs having UL resource at the time location indicated by the second indication, the UE 100 may select the second BWP having the lowest BWP ID among a plurality of candidate BWPs. In some embodiments, the UE 100 may perform a PDSCH reception on slot #n in a first BWP indicated by a DL DCI format, and the DL DCI format may comprise a PDSCH-to-HARQ_feedback timing indicator field. The PDSCH-to-HARQ_feedback timing indicator field may indicate a value of k, and the value of k is the time location of the UL transmission which is a HARQ feedback transmission, wherein k is an integer larger than 0. If the slot #(n+k) in the first BWP contains UL resource, then the UE may transmit HARQ corresponding to the PDSCH reception on slot #(n+k) in the first BWP. Otherwise, the UE 100 may transmit HARQ feedback corresponding to the PDSCH reception on slot #(n+k) in a candidate BWP if the candidate BWP contains UL resource on the slot #(n+k). If there are multiple candidate BWPs contains UL resource on the slot #(n+k), UE 100 may transmit HARQ in a selected candidate BWP according to BWP index. For example, the selected candidate BWP may have the lowest BWP index (i.e. lowest BWP ID).

Figure 23A:
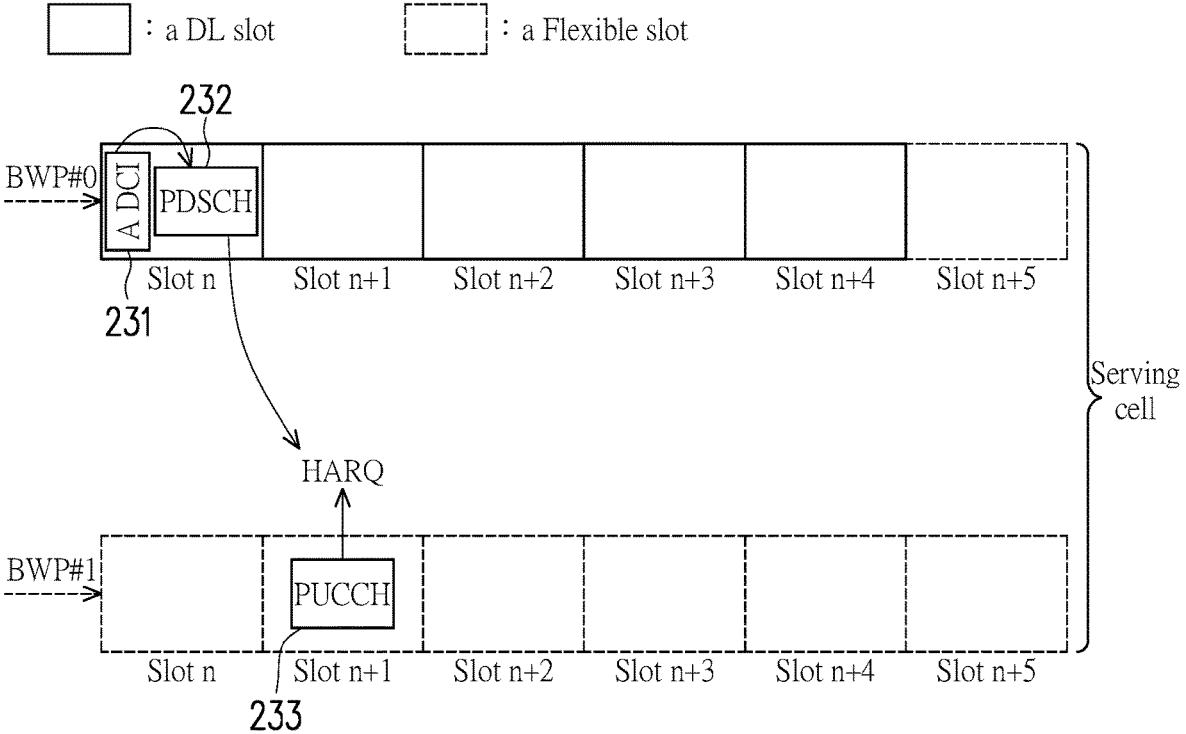
FIG. 23A and FIG. 23B are schematic diagrams that illustrate implicit BWP switching for HARQ according to a DCI according to an exemplary embodiment of the present disclosure.

FIG. 23A is a schematic diagram that illustrates implicit BWP switching for HARQ according to a DCI according to an exemplary embodiment of the present disclosure. Referring to FIG. 23A, the UE 100 may receive the PDSCH 232 indicated by the DCI 231 in Slot #n over the BWP #0. A field (i.e. the second indication) of the DCI 231 (i.e. the first indication) may include a time location of the HARQ feedback. The time location of the HARQ feedback may be a value of k. In FIG. 23A, k=1 is indicated in DCI 231. That is, a PDSCH-to-HARQ_feedback timing indicator field in DCI 231 may indicate a value of 1. Therefore, after receiving the PDSCH 232 indicated by the DCI 231 in the slot #n, the UE 100 may perform the BWP switching to BWP #1 since the slot #(n+1) of the BWP #1 contains the UL resource. Hence, the UE 100 may transmit HARQ feedback (i.e. PUCCH 233) in the slot #(n+1) by using BWP #1.

Figure 23B:
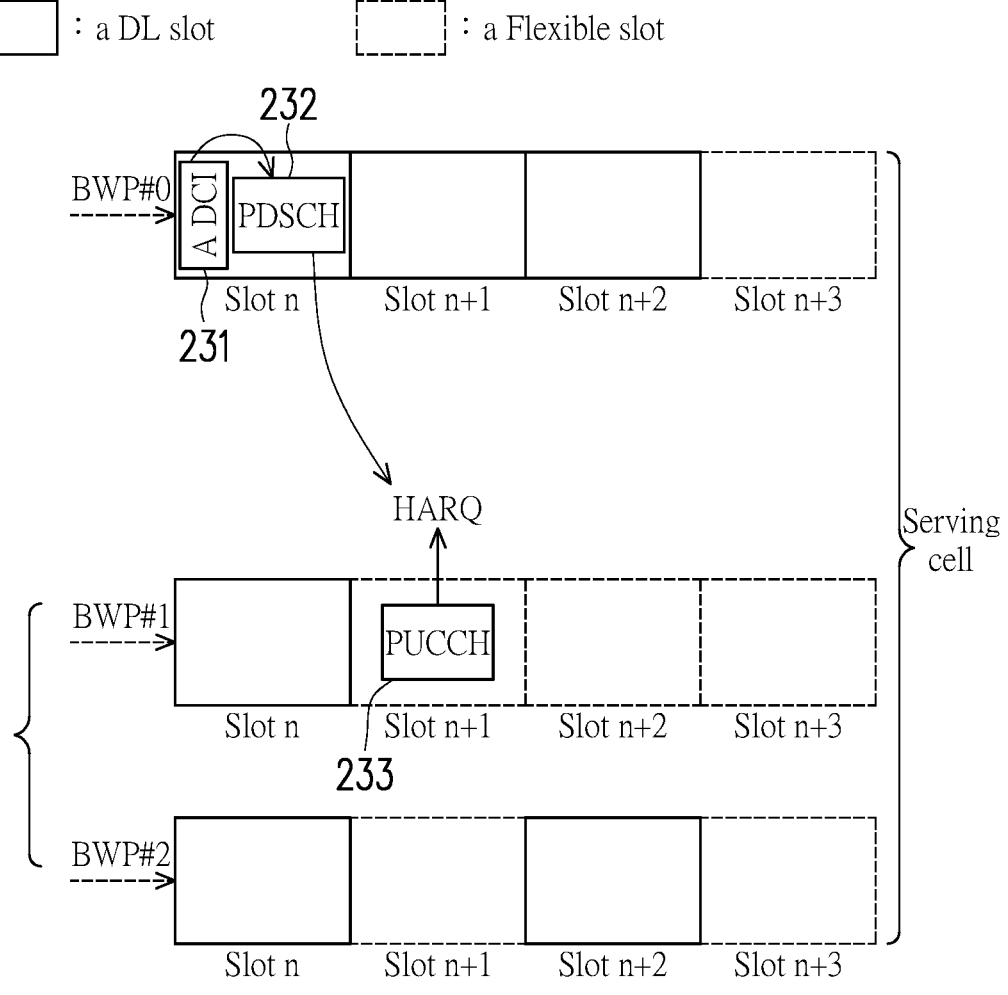

FIG. 23B is a schematic diagram that illustrates implicit BWP switching for HARQ according to a DCI according to an exemplary embodiment of the present disclosure. Referring to FIG. 23B, the UE 100 may receive the PDSCH 232 indicated by the DCI 231 in Slot #n over the BWP #0. A field (i.e. the second indication) of the DCI 231 (i.e. the first indication) may include a time location of the HARQ feedback. The time location of the HARQ feedback may be a value of k. In FIG. 23B, k=1 is indicated in DCI 231. Besides, both of BWP #1 and the BWP #2 have UL resource in the slot #(n+1), and the UE 100 may select the BWP #1 having the lower BWP ID to transmit HARQ feedback. Therefore, after receiving the PDSCH 232 indicated by the DCI 231 in the slot #n, the UE 100 may perform the BWP switching to BWP #1. Hence, the UE 100 may transmit HARQ feedback (i.e. PUCCH 233) in the slot #(n+1) by using BWP #1.

Figure 24A:
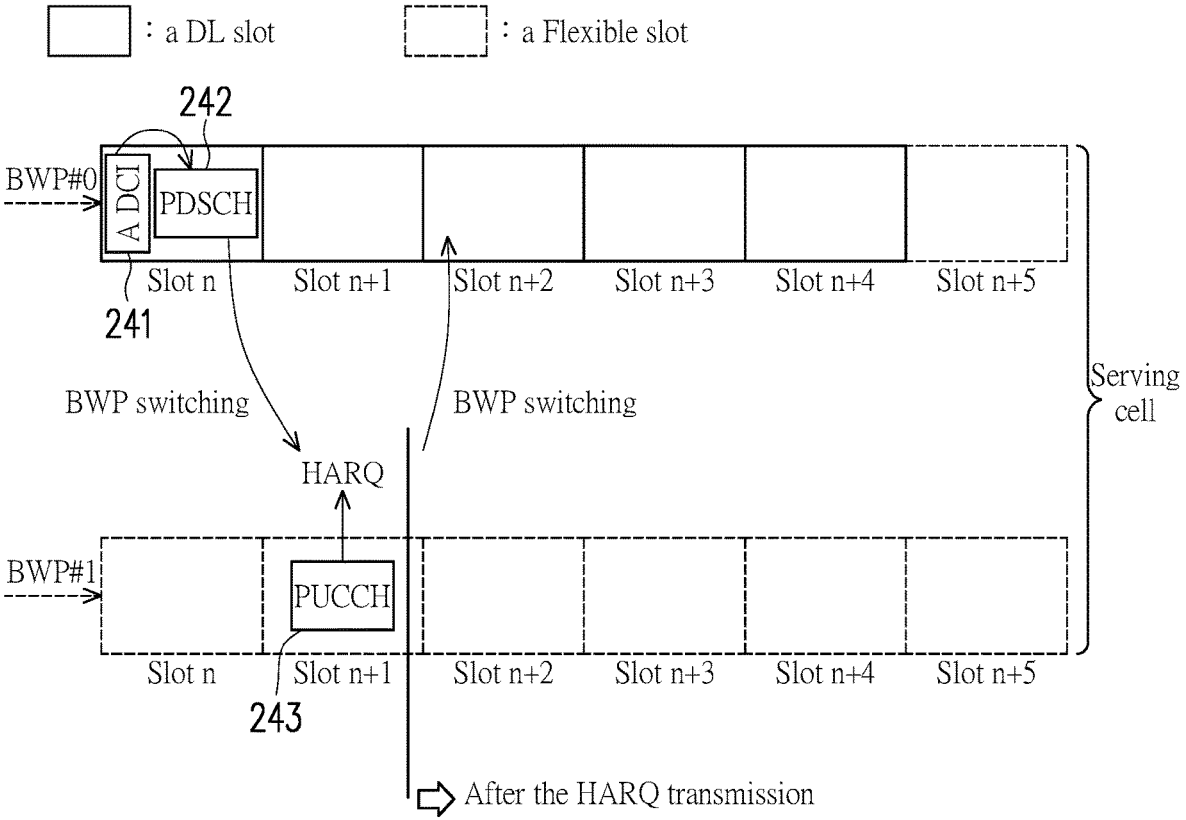
FIG. 24A to FIG. 24C are schematic diagrams that illustrate BWP switching after UL transmission according to an exemplary embodiment of the present disclosure.

FIG. 24A is a schematic diagram that illustrates BWP switching after UL transmission according to an exemplary embodiment of the present disclosure. Referring to FIG. 24A, the UE 100 may receive the PDSCH 242 indicated by the DCI 241 in Slot #n over the BWP #0. After the UL transmission (i.e. PUCCH 243) indicated by the second indication in BWP #1 is accomplished, the UE 100 perform BWP switching to BWP #0. That is, after the UL transmission indicated by the second indication in the second BWP is accomplished, the UE 100 may perform BWP switching from the second BWP back to the first BWP automatically without any indication.

In some embodiments, after the UL transmission, the UE 100 may perform BWP switching if the second BWP has no DL resource within a time period. The time period may be indicated by a RRC configuration. That is, the UE 100 may be indicated, (e.g., by RRC configuration) a parameter of PeriodAfterUL. The UE 100 may perform BWP switching from the second BWP to the first BWP after the UL transmission, if the second BWP does not have DL resource within a time period of PeriodAfterUL which is started from the end of the UL transmission.

Figure 24B:
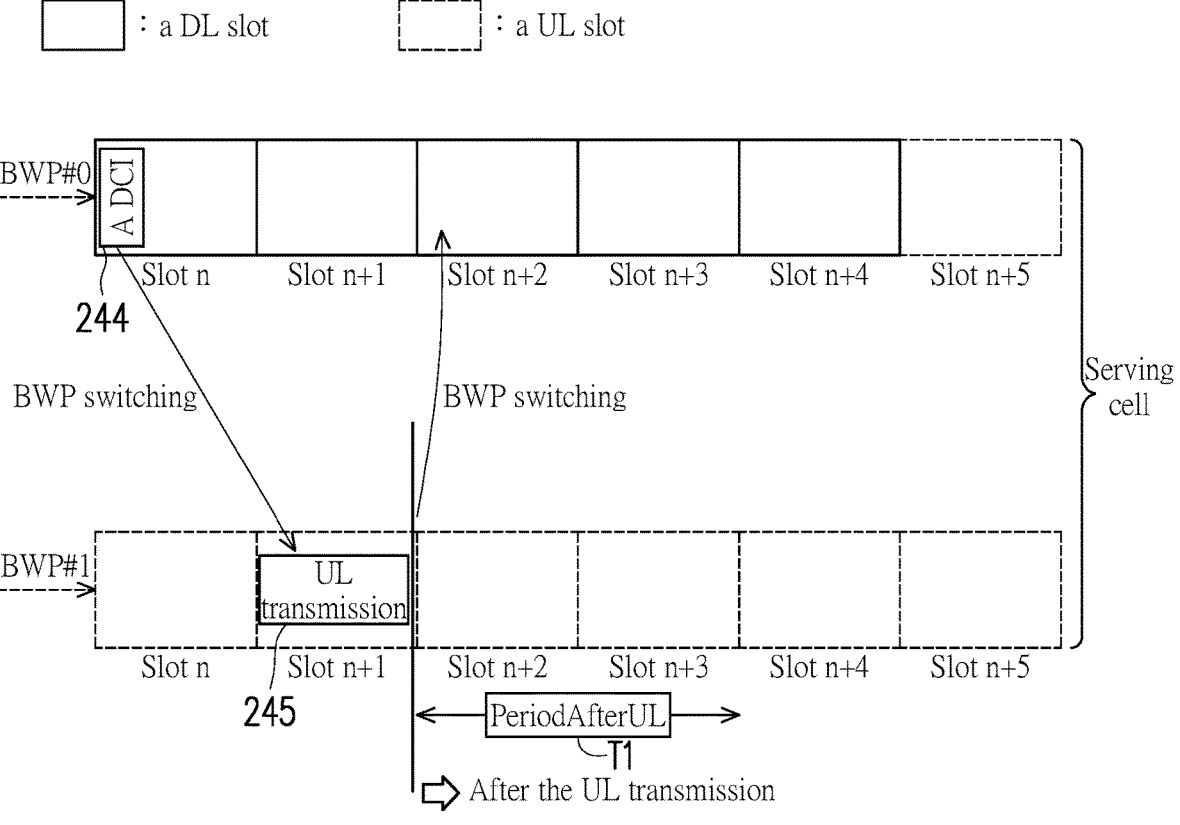

FIG. 24B is a schematic diagram that illustrates BWP switching after UL transmission according to an exemplary embodiment of the present disclosure. Referring to FIG. 24B, the UE 100 may receive the DCI 244 indicating the UL transmission 245 in slot #(n+1). The UE 100 may perform the BWP switching form BWP #0 to BWP #1 to perform the UL transmission 245. After the UL transmission 245 in slot #(n+1), the UE 100 may perform the BWP switching from BWP #1 to BWP #0 since there are no DL resource within the time period of PeriodAfterUL T1 (e.g., two slots) in BWP #1.

In some embodiments, after the UL transmission, the UE 100 may perform BWP switching from the second BWP to a third BWP which has the earliest DL resource. In some embodiments, after the UL transmission, the UE 100 may perform BWP switching from the second BWP to a candidate BWP which DL resource appears earliest. If there are multiple candidate BWPs, the UE 100 may choose a candidate BWP according to BWP ID, e.g., lower BWP ID.

Figure 24C:
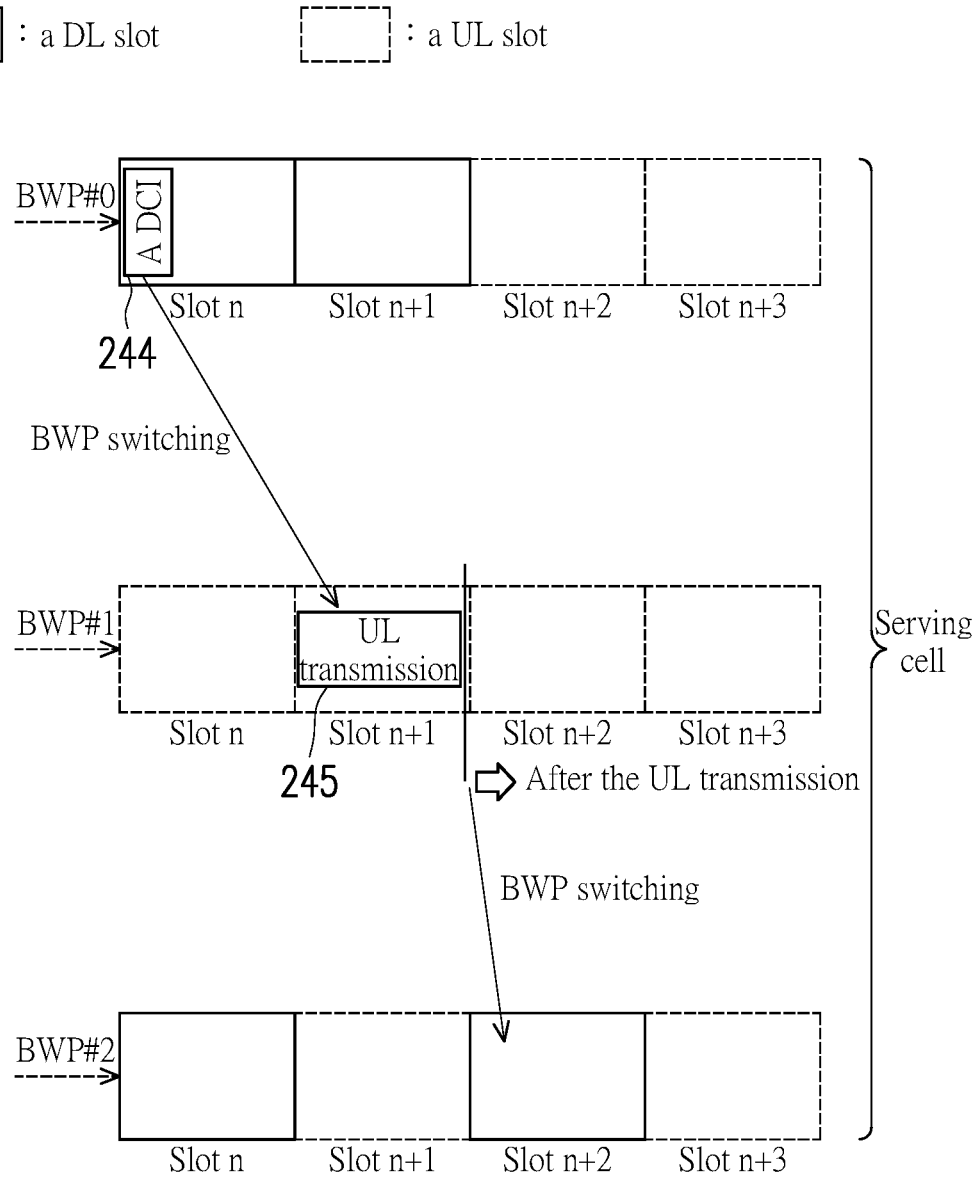

FIG. 24C is a schematic diagram that illustrates BWP switching after UL transmission according to an exemplary embodiment of the present disclosure. Referring to FIG. 24C, the UE 100 may receive the DCI 244 indicating the UL transmission 245 in slot #(n+1). The UE 100 may perform the BWP switching form BWP #0 to BWP #1 to perform the UL transmission 245. After the UL transmission 245 in slot #(n+1), the UE 100 may perform the BWP switching from BWP #1 to BWP #2 since BWP #2 has DL resource in slot #(n+2) which is the earliest among BWP #0, BWP #1 and BWP #2.

Figure 25:
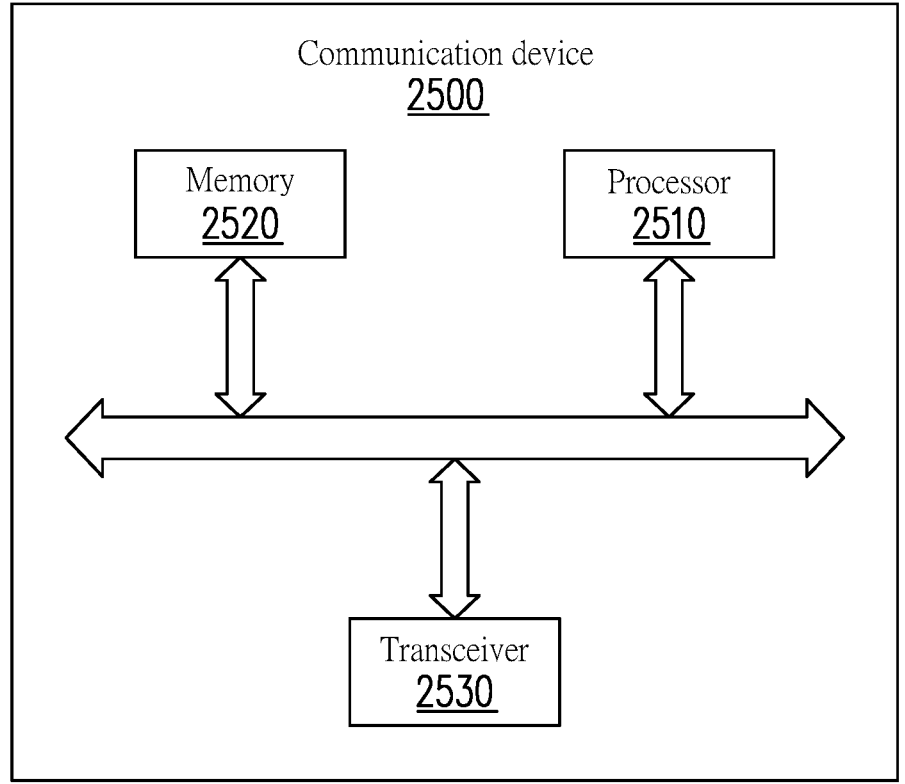
FIG. 25 is a block diagram that illustrates a communication device according to an exemplary embodiment of the present disclosure.

FIG. 25 is a block diagram that illustrates a communication device 2500 according to an exemplary embodiment of the present disclosure. Referring to FIG. 25, the communication device 2500 may be a UE. The communication device 2500 may include, but is not limited thereto a processor 2510. The processor 2510 (e.g., having processing circuitry) may include an intelligent hardware device, e.g., a Central Processing Unit (CPU), a microcontroller, an ASIC, and etc. The processor 2510 can call and run a computer program from a memory to implement the method in the embodiment of the disclosure.

Since the program code stored in the communication device 2500 adopts all the technical solutions of all the foregoing embodiments when being executed by the processor 2510, it at least has all the advantageous effects brought by all the technical solutions of all the foregoing embodiments, and no further description is incorporated herein.

Optionally, as shown in FIG. 25, the communication device 2500 may further include a memory 2520. The memory 2520 may include computer-storage media in the form of volatile and/or non-volatile memory. The memory 2520 may be removable, non-removable, or a combination thereof. Exemplary memory includes solid-state memory, hard drives, optical-disc drives, and etc. The processor 2510 may call and run a computer program from the memory 2520 to implement the method in the embodiment of the disclosure.

The memory 2520 may be a separate device independent of the processor 2510, or may be integrated in the processor 2510.

Optionally, as shown in FIG. 25, the communication device 2500 may further include a transceiver 2530, and the processor 2510 may control the transceiver 2530 to communicate with other devices. The transceiver 2500 having a transmitter (e.g., transmitting/transmission circuitry) and a receiver (e.g., receiving/reception circuitry) may be configured to transmit and/or receive time and/or frequency resource partitioning information. In some implementations, the transceiver 2500 may be configured to transmit in different types of subframes and slots including, but not limited to, usable, non-usable and flexibly usable subframes and slot formats. The transceiver 2530 may be configured to receive data and control channels. The transceiver 2530 may execute operations of Low Noise Amplifying (LNA), impedance matching, analog-to-digital (ADC) converting, digital-to-analog (DAC) converting, frequency mixing, up-down frequency conversion, filtering, amplifying and/or similar operations.

Specifically, the transceiver 2530 may send information or data to other devices, or receive information or data sent by other devices.

Specifically, the transceiver 2530 may include a transmitter and a receiver. The transceiver 2530 may further include an antenna, and the number of antennas may be one or more.

In view of the aforementioned descriptions, a frequency range may be segmented into multiple resources as indicated in TDD configuration, so as to achieve full duplex. Further, the collision of the UL transmission and the DL reception occurring at the UE side may be solved, so as to enhance UL coverage, reduce latency and improve system capacity for NR duplex operation. Moreover, the BWP switching for UL transmission and after the UL transmission may be indicated to reduce latency of the UL transmission. It should be noted that this disclosure does not require all the aforementioned advantages.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations could be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. Method for duplex operation used by a user equipment (UE), the method comprising:

receiving at least one indication indicating at least one of a DL reception and a UL transmission, wherein the at least one indication comprises a first indication indicating the DL reception and a second indication indicating the UL transmission, the DL reception and the UL transmission are overlapped in time domain; and performing either the DL reception through a first resource or the UL transmission through a second resource according to a rule, wherein the step of performing either the DL reception through the first resource or the UL transmission through the second resource according to the rule comprises:

performing the DL reception through the first resource without performing the UL transmission through the second resource if the DL reception is a SSB reception and the UL transmission is a higher layer configured UL transmission or a DCI scheduled UL transmission.

2. He method according to claim 1, wherein the first resource and the second resource are Frequency-Division Multiplexed (FDMed).

3. The method according to claim 1, wherein the step of performing the DL reception through the first resource or the UL transmission through the second resource according to the rule comprises:

performing the UL transmission through the second resource without performing the DL reception through the first resource if the DL reception is CORESET reception associated with a first group of search space (SS) and the second indication is a dynamic scheduled DCI.

4. He method according to claim 3, wherein the first group of SS comprises type 1 common search space (CSS) with dedicated RRC configuration, type3 CSS, or UE specific SS.

5. The method according to claim 1, wherein the step of performing the DL reception through the first resource or the UL transmission through the second resource according to the rule comprises:

performing the DL reception through the first resource without performing the UL transmission through the second resource if the DL reception is CORESET reception associated with a second group of search space and the second indication is a dynamic scheduled DCI.

6. He method according to claim 5, wherein the second group SS comprises type 1 CSS without dedicated RRC configuration, type 0 CSS, type 0A CSS, or type 2 CSS.

7. The method according to claim 1, wherein the step of performing the DL reception through the first resource or the UL transmission through the second resource according to the rule comprises:

performing the UL transmission through the second resource without performing the DL reception through the first resource if the first indication is a higher layer configuration and the second indication is a dynamic scheduled DCI.

8. The method according to claim 1, wherein the step of performing the DL reception through the first resource or the UL transmission through the second resource according to the rule comprises:

performing the DL reception through the first resource without performing the UL transmission through the second resource if the first indication is a dynamic scheduled DCI and the second indication is a higher layer configuration.

9. The method according to claim 1, wherein the step of performing the DL reception through the first resource or the UL transmission through the second resource according to the rule comprises:

performing the DL reception through the first resource without performing the UL transmission through the second resource if a first priority indicated by the first indication is higher than a second priority indicated by the second indication, the first indication is a dynamic scheduled DCI and the second indication is another dynamic scheduled DCI.

10. The method according to claim 1, wherein the step of performing the DL reception through the first resource or the UL transmission through the second resource according to the rule comprises:

performing the DL reception through the first resource without performing the UL transmission through the second resource if a receiving time of the first indication is later than a receiving time of the second indication, the first indication is a dynamic scheduled DCI, the second indication is another dynamic scheduled DCI, and a first priority indicated by the first indication is identical with a second priority indicated by the second indication.

11. The method according to claim 1, wherein the step of performing the DL reception through the first resource or the UL transmission through the second resource according to the rule comprises:

performing the UL transmission through the second resource without performing the DL reception through the first resource if the UL transmission is a Message 1 (Msg1) or a Message 3 (Msg3) of random access (RA) procedure.

12. The method according to claim 1, wherein the step of performing the DL reception through the first resource or the UL transmission through the second resource according to the rule comprises:

performing the UL transmission through the second resource without performing the DL reception through the first resource if a second priority indicated by the second indication is higher than a first priority indicated by the first indication, the first indication is a dynamic scheduled DCI and the second indication is another dynamic scheduled DCI.

13. The method according to claim 1, wherein the step of performing the DL reception through the first resource or the UL transmission through the second resource according to the rule comprises:

performing the UL transmission through the second resource without performing the DL reception through the first resource if a receiving time of the second indication is later than a receiving time of the first indication, the first indication is a dynamic scheduled DCI, the second indication is another dynamic scheduled DCI, and a first priority indicated by the first indication is identical with a second priority indicated by the second indication.

14. He method according to claim 1, wherein the first indication is a higher layer configuration or a dynamic scheduled DCI.

15. The method according to claim 1, wherein the second indication is a higher layer configuration or a dynamic scheduled DCI.

16. He method according to claim 1, wherein the first resource is a DL resource and the second resource is a flexible resource.

17. He method according to claim 1, wherein the first resource is a flexible resource and the second resource is a UL resource.

18. He method according to claim 1, wherein the first resource is a flexible resource and the second resource is another flexible resource.

19. The method according to claim 1, wherein the first resource is a DL resource and the second resource is a UL resource.

20. A method for duplex operation used by a user equipment (UE), the method comprising:

receiving a first indication indicating a DL reception and a second indication indicating a UL transmission; and performing either the DL reception through a first resource or the UL transmission through a second resource according to a rule, wherein the DL reception indicated by the first indication and the UL transmission indicated by the second indication are overlapped in time domain, wherein the DL reception comprises a higher layer configured DL reception, and the step of performing the DL reception through the first resource or the UL transmission through the second resource according to the rule comprises:

performing the UL transmission through the second resource without expecting to perform the higher layer configured DL reception through the first resource if the UL transmission is a Scheduling Request (SR).

21. A base station, comprising:

a transceiver; and a processor connected to the transceiver and configured at least to:

transmit at least one indication indicating at least one of a DL reception and a UL transmission, wherein the at least one indication comprises a first indication indicating a DL reception and a second indication indicating a UL transmission, and the DL reception indicated by the first indication and the UL transmission indicated by the second indication are overlapped in time domain, the DL reception comprises a higher layer configured DL reception; and receive the UL transmission through a second resource without transmitting the higher layer configured DL reception through a first resource when the UL transmission corresponds to a Scheduling Request (SR).

* * * * *